(12) United States Patent
Aggarwal et al.

(10) Patent No.: US 9,504,132 B2
(45) Date of Patent: *Nov. 22, 2016

(54) DISTRIBUTED PROCESSING USING RESOURCES OF INTELLIGENT LIGHTING ELEMENTS OF A LIGHTING SYSTEM

(71) Applicant: ABL IP HOLDING LLC, Conyers, GA (US)

(72) Inventors: Januk Aggarwal, Atlanta, GA (US); Jason Rogers, Herndon, VA (US); David P. Ramer, Reston, VA (US); Jack C. Rains, Jr., Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 675 days.

This patent is subject to a terminal disclaimer.

(21) Appl. No.: 13/903,428

(22) Filed: May 28, 2013

(65) Prior Publication Data

US 2014/0354187 A1    Dec. 4, 2014

(51) Int. Cl.
  *G05B 15/02* (2006.01)
  *H05B 37/02* (2006.01)

(52) U.S. Cl.
  CPC .......... *H05B 37/0245* (2013.01); *G05B 15/02* (2013.01); *G05B 2219/2664* (2013.01); *Y02B 20/48* (2013.01)

(58) Field of Classification Search
  CPC ............ G05B 2219/2664; G05B 2219/23154; G05B 2219/23153
  See application file for complete search history.

(56) References Cited

U.S. PATENT DOCUMENTS

| | | |
|---|---|---|
| 4,749,254 A | 6/1988 | Seaver |
| 5,705,804 A | 1/1998 | Ramer et al. |
| 5,769,527 A | 6/1998 | Taylor et al. |
| 6,009,455 A | 12/1999 | Doyle |
| 6,043,873 A | 3/2000 | Ramer et al. |
| 6,363,434 B1 | 3/2002 | Eytchison |
| 6,548,967 B1 * | 4/2003 | Dowling ............ G06Q 30/0201 315/307 |
| 7,003,547 B1 | 2/2006 | Hubbard |

(Continued)

FOREIGN PATENT DOCUMENTS

WO    2011121470 A1    10/2011

OTHER PUBLICATIONS

Non-final Office Action dated Mar. 30, 2015, issued in U.S. Appl. No. 14/507,222, filed Oct. 6, 2014.

(Continued)

*Primary Examiner* — Kenneth M Lo
*Assistant Examiner* — Derrick Boateng
(74) *Attorney, Agent, or Firm* — RatnerPrestia

(57) ABSTRACT

An exemplary lighting system utilizes intelligent system elements, such as lighting devices, user interfaces for lighting control or the like and possibly sensors, and utilizes network communication amongst such intelligent system elements. Some processing functions performed within the system are implemented on a distributed processing basis, by two or more of the intelligent elements of the lighting system. Distributed processing, for example, may enable use of available processor and/or memory resources of a number of intelligent system elements to process a particular job. Another distributed processing approach might entail programming to configure two or more of the intelligent system elements to implement multiple instances of a server functionality with respect to client functionalities implemented on intelligent system elements.

20 Claims, 4 Drawing Sheets

(56) References Cited

U.S. PATENT DOCUMENTS

| | | |
|---|---|---|
| 7,333,903 B2 | 2/2008 | Walters et al. |
| 7,546,167 B2 | 6/2009 | Walters et al. |
| 8,130,371 B2 | 3/2012 | Imura |
| 8,140,276 B2 | 3/2012 | Walters et al. |
| 8,732,031 B2 | 5/2014 | Martin et al. |
| 8,755,039 B2 | 6/2014 | Ramer et al. |
| 2002/0016639 A1 | 2/2002 | Smith et al. |
| 2006/0075407 A1 | 4/2006 | Powers et al. |
| 2006/0075408 A1 | 4/2006 | Powers et al. |
| 2007/0045524 A1 | 3/2007 | Rains et al. |
| 2007/0268687 A1 | 11/2007 | Scannell, Jr. |
| 2008/0265799 A1 | 10/2008 | Siebert |
| 2009/0051506 A1 | 2/2009 | Hicksted et al. |
| 2009/0299527 A1 | 12/2009 | Huizenga et al. |
| 2010/0114340 A1 | 5/2010 | Huizenga et al. |
| 2010/0176733 A1 | 7/2010 | King |
| 2010/0259931 A1 | 10/2010 | Chemel et al. |
| 2010/0301769 A1 | 12/2010 | Chemel et al. |
| 2012/0002406 A1 | 1/2012 | Leadford et al. |
| 2012/0025717 A1 | 2/2012 | Klusmann et al. |
| 2012/0040606 A1 | 2/2012 | Verfuerth |
| 2012/0044350 A1 | 2/2012 | Verfuerth |
| 2012/0086561 A1 | 4/2012 | Ilyes et al. |
| 2012/0130548 A1 | 5/2012 | Fadell et al. |
| 2013/0159754 A1 | 6/2013 | Wendt |
| 2013/0293112 A1 | 11/2013 | Reed et al. |
| 2014/0035482 A1 | 2/2014 | Rains, Jr. et al. |

OTHER PUBLICATIONS

Non-final Office Action dated Mar. 26, 2015, issued in U.S. Appl. No. 14/219,657, filed Mar. 19, 2014.
Non-final Office Action dated Mar. 20, 2015, issued in U.S. Appl. No. 13/964,564, filed Aug. 12, 2013.
U.S. Appl. No. 13/564,519, filed Aug. 17, 2012, Rains, Jr. et al.
"Introducing Philips hue: the world's smartest LED bulb, marking a new era in home lighting"; Philips Sense and Simplicity; http://www.newscenter/philips.com/main/standard/news/press/2012/20121029-Introducing- . . . ; Oct. 29, 2012; Amsterdam, The Netherlands.
Chris Davies; "Philips hue Review"; SlashGear; http://www.slashgear.com/philips-hue-review-07255995/ . . . ; Nov. 7, 2012, London, United Kingdom.
"Raspberry Pi a $30 Computer set to Revolutionize the Teaching of Computing"; Silver-Fish hubpages; http://silver-fish.hubpages.com/hub/Raspberry-Pi-a-30-Computer; Aug. 15, 2012.
U.S. Appl. No. 13/463,594, filed May 3, 2012, entitled "Lighting Devices With Integral Sensors for Detecting One or More External Conditions and Networked System Using Such Devices."
Non-final Office Action issued in U.S. Appl. No. 13/971,194, dated Dec. 9, 2015.
Notice of Allowance dated Mar. 18, 2016, issued in U.S. Appl. No. 14/219,657, filed Mar. 19, 2014.
Non-final Office Action dated Feb. 25, 2016, issued in U.S. Appl. No. 13/971,428, filed Aug. 20, 2013.
International Search Report and Written Opinion of International Application No. PCT/US2013/050657, dated Jan. 9, 2014.
International Search Report and Written Opinion of International Application No. PCT/US2013/037968 dated Jul. 2, 2013.
Entire prosecution history of U.S. Appl. No. 13/463,594, filed May 3, 2012, entitled "Lighting Devices With Sensors for Detecting One or More External Conditions and Networked System Using Such Devices."
Entire prosecution History of U.S. Appl. No. 14/285,881, filed May 23, 2014, entitled "Lighting Devices With Sensors for Detecting One or More External Conditions and Networked System Using Such Devices."
Entire prosecution history of U.S. Appl. No. 13/463,586, filed May 3, 2012, entitled "Networked Arcitecture for System of Lighting Devices Having Sensors, for Intelligent Applications."
Entire prosecution history of U.S. Appl. No. 13/564,519, filed Aug. 1, 2012, entitled "Networked System of Intelligent Lighting Devices With Sharing of Processing Resources of the Devices With Other Entities."

* cited by examiner

DISTRIBUTED PROCESSING USING RESOURCES OF INTELLIGENT LIGHTING ELEMENTS OF A LIGHTING SYSTEM

TECHNICAL FIELD

The present subject matter relates to techniques and equipment to implement various data processing functions on a distributed processing basis utilizing memory and/or processing resources of intelligent elements of a lighting system and data communications amongst the system elements.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

Sensing and network communications have focused on the lighting functions/applications of the lighting devices. For example, sensors may be provided in a lighting device to detect parameters relevant to control operation of the lighting device, and the processor in the device controls the source(s) of the device in response to the sensor inputs. Alternatively or in addition, a communication interface in each of a number of networked lighting devices may allow communication about the status of each lighting device to a system control center. A programmed computer or a person at the control center then may be able to send commands to individual lighting devices or to groups of lighting devices, for example, based on a decision responsive to one or more conditions sensed by some or all of the lighting devices.

However, these advances in lighting devices and networked systems have mainly addressed aspects of the lighting provided by the lighting devices. For example, lighting devices may be adjusted, turned ON and/or turned OFF in response to user input or based on monitored conditions, either by processor logic within the device(s) or commands from a local controller (e.g. configured as a control panel on a wall) or from a central control.

The increasingly sophisticated electronics associated with lighting often now include a central processing device as well as memory for program and data storage within each of many lighting devices. Where the lighting devices are networked, each device also includes some form of communication interface, to enable the desired communication with other lighting devices, in-room lighting controllers and/or with networked control computers.

The processing, memory and communication elements of the lighting devices involve costs, when purchasing and deploying the lighting devices. Building an installed base of such equipment, with substantial numbers of lighting devices each having sophisticated electronics, incurs a financial investment. In many cases, the electronics are a substantial cost for each lighting device, and that cost may be multiplied by a large number of such devices in an extensive networked implementation owned by or operated for a large enterprise. Similar processing and memory resources may be included in other system elements, such as lighting controllers in the various areas of the premises within which the system is installed. Despite the infrastructure cost, the memory and processing resources may be idle for substantial periods of time, e.g. when lighting devices are OFF for extended periods or even during operations when individual lighting devices and/or lighting controllers are not actively communicating or not using full processing or memory resources (for example during intervals between substantial device setting changes, which may require execution of a processing intensive algorithm). In addition to the infrastructure costs for such resources in the lighting devices and/or controllers, such a system may include additional computer resources for implementation of a more centralized control function.

Hence, there is room for improvement in the usage of the resources in various elements of a networked intelligent lighting system, e.g. to increase the usage of costly processing and memory resources in networked elements and/or to reduce or eliminate the need for additional computer hardware to host a centralized control functionality.

SUMMARY

The technologies disclosed herein include systems that utilize intelligent elements for lighting and related purposes, elements such as lighting devices, lighting controllers and sensors for use in such system, and/or to techniques for implementing various types of distributed processing via such systems or elements.

An exemplary system includes intelligent system elements, each of which includes a lighting related component. For example, a number of the system elements each include a light source as the lighting related component and are each configured as a lighting device. At least one of the intelligent system elements either includes a user interface component and is configured as a lighting controller, or includes a detector as the lighting related component and is configured as a sensor.

In addition to the lighting related component, an exemplary intelligent system element for operation in such a system may include a communication interface configured to enable communication via a link of a data communication network with other intelligent elements of the lighting system. A processor is coupled to the lighting related component and coupled to communicate via the communication interface and the network link. The system element also include a memory accessible to the processor and programming in the memory which configures the processor to control a lighting related operation of the intelligent system element and which configures the processor to implement distributed processing functions.

Several examples of distributed processing functions are disclosed in the subsequent detailed description.

For example, when one intelligent system element has a processing job to perform using resources of other intelligent elements, the one element can query the other elements of the lighting system and receive responses from the other intelligent elements of the lighting system as to whether or not the other intelligent elements of the lighting system have processing or memory resources available for the processing job. Based on the responses, the one intelligent element allocates portions of the processing job to some number of the other intelligent elements of the lighting system. The one intelligent element can then send data and instructions to each element of the other intelligent elements among that number, for performing an allocated portion of the processing job; and the one intelligent element receives from those other intelligent elements results of the performance of the allocated portions of the processing job. The one intelligent element can then process the received results to determine an overall result of the processing job and perform some action based on the overall result of the processing job.

As another example of distributed processing, an intelligent element may respond to an inquiry received from another intelligent element that has a processing job to perform on a distributed basis by sending a response with information identifying processing resources of the processor and/or resources in the memory available for distributed processing via the network to the other intelligent element. The element with the available resource(s) in this example receives data and instructions for performing a portion of the processing job from the other intelligent element via the network. The element will then process the received data in accordance with the instructions using resources of the processor and/or memory of the lighting device and send a result of the processing via the network to the other intelligent element.

By way of another example, a system may implement a server functionality on a distributed basis. In an example of this later type, a lighting system using intelligent elements also includes two instances of server programming stored in the memories of respective first and second ones of the intelligent system elements for execution by processors of the first and second intelligent system elements. The two instances of the server programming configure the first and second intelligent system elements to operate in a distributed processing fashion to implement a server function with respect to an overall processing function of the system and related server communications via the data communication network. Such a system may also include client programming stored in memories of intelligent system elements other than the first and second lighting devices for execution by processors of the other intelligent elements to configure each of the other intelligent elements to implement a client function with respect to the overall processing function of the system and related client communications with the server function implemented by the instances of the server programming on the first and second intelligent elements.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the Figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to lighting systems utilizing intelligent elements, to distributed processing that may be implemented on such systems and/or elements to various types of the elements. Distributed processing, for example, may enable use of available processor and/or memory resources of a number of intelligent system elements to process a particular job. Another distributed processing approach might entail programming to configure two or more of the intelligent system elements to implement multiple instances of a server functionality with respect to client functionalities implemented on intelligent system elements. Reference now is made in detail to the examples illustrated in the accompanying drawings and discussed below.

Figure 1:
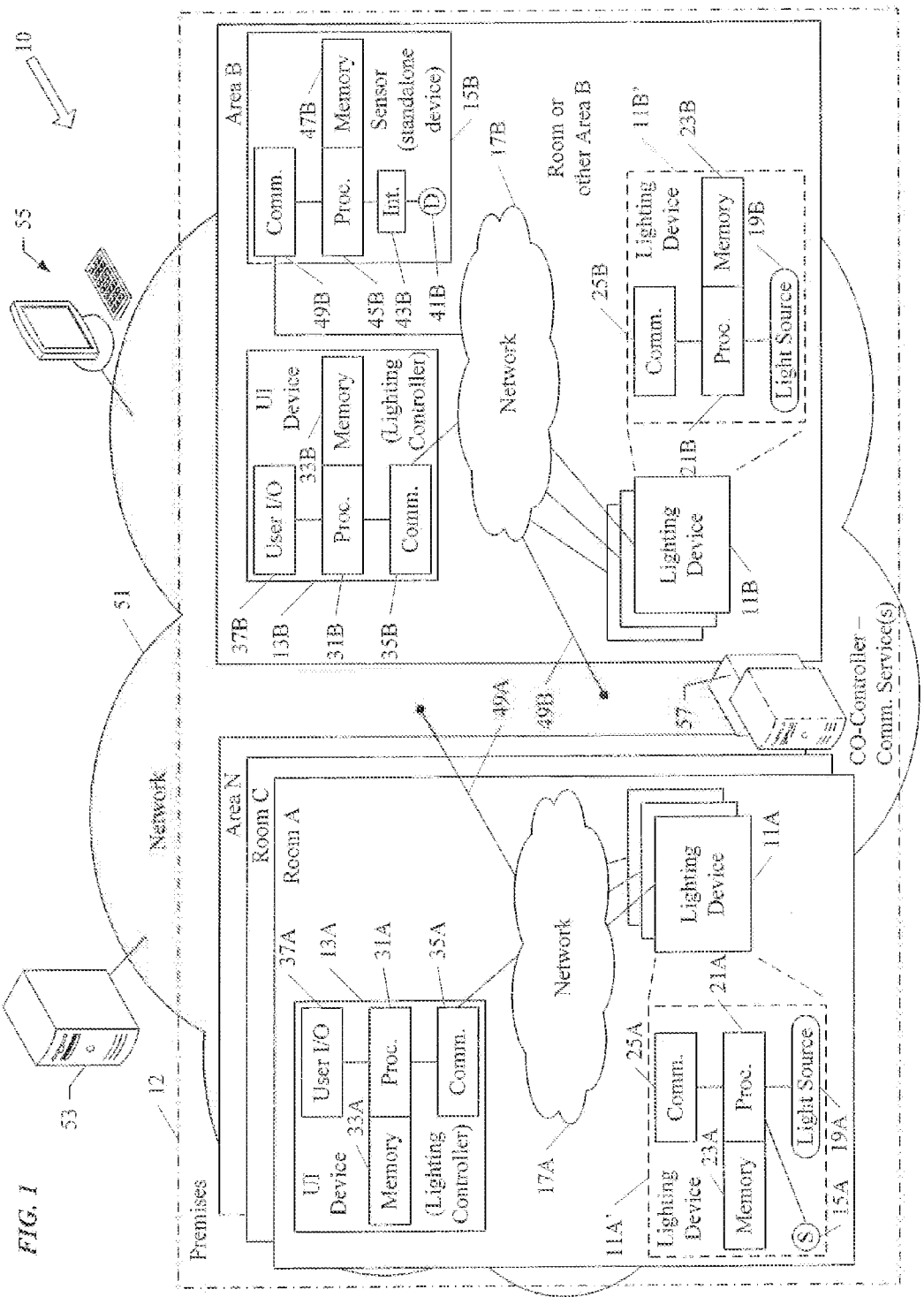
FIG. 1 is a functional block diagram of a simple example of a lighting system having intelligent lighting devices and other intelligent components for lighting related functions and possibly other functions, where the various intelligent system elements are linked or networked for data communications.

FIG. 1 is a high-level block diagram of a networked lighting system 10, many elements of which are installed at a premises 12. The premises 12 may be any location or locations serviced for lighting and other purposes by a networked intelligent lighting system of the type described here. Most of the examples discussed below focus on building installations, for convenience, although the system may be readily adapted to outdoor lighting. Hence, the exemplary system 10 provides lighting and possibly other services in a number of service areas A to N in or associated with a building, represented by room A and room or other service area B, and generally by other room C and service area N. Examples of other types of service areas include a corridor a building and an outdoor area associated with a building. Further examples of indoor service areas include storage areas, stairwells, etc., whereas further examples of outdoor service areas include parking, path, roadway, area, etc.

The system elements for operation in a lighting system, in a system like system 10 of FIG. 1, may include any number of lighting devices, such as fixtures and lamps, as well as lighting controllers, such as switches dimmers and smart control panels. At least a substantial number of the lighting devices are implemented as intelligent system elements, which each include a processor and a memory. The intelligent lighting devices also incorporate network communication capabilities.

At least one of the intelligent system elements either includes a user interface component and is configured as a lighting controller, or includes a detector as the lighting related component and is configured as a sensor. The exemplary system 10 includes intelligent elements of both of these types. The lighting controllers may be implemented by intelligent user interface devices with processor, memory and communication components, although intelligent user interface devices on the system 10 may serve other purposes. The exemplary lighting system elements may also include one or more sensors used to control lighting functions, such as occupancy sensors, ambient light sensors and light or temperature feedback sensors that detect conditions of or produced by one or more of the lighting devices. The sensors may be implemented in intelligent standalone system elements, or the sensors may be incorporated in intelligent lighting devices, e.g. as an enhanced capability of a lighting device.

As shown (and discussed in more detail later), many elements of the system 10 include processors and memories and such intelligent system elements are coupled or linked into a network for data communication. A system like that shown in the drawing may incorporate or at least provide communication capabilities or services for use by other devices within the premises 12.

A lighting system such as 10, which utilizes many intelligent elements, has considerable inherent processing and memory capacity. Many tasks can be performed by each element utilizing the element's own internal processor and memory. For example, a lighting device will be able to receive and appropriately process a lighting command, e.g. to set a light level and/or to set an associated color characteristic of the device's light source, to adjust its operational light output as commanded, without the need for resources of other intelligent elements of the system. A user interface (UI) device configured as a lighting controller will be able to send commands in response to user inputs to any lighting devices it controls; and a sensor will be able to report its sensed condition to any system elements configured to receive and utilize such information. However, the presence of the extensive processing and memory resources of the system 10 offers opportunities for implementing other tasks by sharing the work to implement such tasks across multiple intelligent elements of the system 10 based at least in part on communication via the network between the intelligent system elements. Stated another way, the system 10 is also configured to allow the intelligent elements to perform at least some processing tasks on a distributed processing basis, coordinated via network communication, such that available processing and/or memory resources of multiple elements support completion of a shared task or job. Hence, in our examples of the system 10, the exemplary system elements each utilize programming which configures the processor to control a lighting related operation of the intelligent system element and which configures the processor to implement distributed processing functions.

The shared task or job may be related to system operations, including lighting functions. For example, centralized control functions that might otherwise be implemented in host computer hardware (e.g. configured as a control server) may be implemented by the intelligent lighting devices, user interface devices and/or sensors of the exemplary system 10 on a distributed processing basis. Other distributed processing tasks may be more ancillary in nature, e.g. processing an audio input from one of the intelligent system elements to recognize speech content and identity an appropriate responsive action or to perform a statistical analysis of sensor input data from all sensors of a particular type on the premises 12 for an identified purpose. Still further types of distributed processing tasks may be arbitrary and relatively unrelated to regular operations of the system 10, for example, processing a task received from an outside party needing substantial processing or memory resources for that party's own reason (s). Examples of actions that may result from or be outcomes of distributed processing may involve establishing control settings for one or more of the lighting devices, more general activities in response to audible or visible user input (e.g. to access remote data and provide an output, to set a light parameter, etc.), or to provide processed results from complex data (e.g. recognize a particular face, voice or event in an audio input or image or video file, or to process data from any number of sensors to obtain a composite result) for system use or to supply to an outside entity.

In our illustrated example, each room or other type of lighting service area illuminated by the system 10 includes a number of lighting devices as well as other system elements such as one or more user interface devices each configured as a lighting controller or the like.

As shown, the service area represented by room A in the example includes an appropriate number of first lighting devices 11A, for example, to provide a desired level of lighting for the intended use of the particular space in room A. The equipment in room A also includes a user interface (UI) device, which in this example, serves as a first lighting controller 13A. In a similar fashion, the equipment in room or other service area B in the example includes an appropriate number of second lighting devices 11B, for example, to provide a desired level of lighting for the intended use of the particular space in area B. The equipment in service area B also includes a user interface (UI) device, which in this example, serves as a second lighting controller 13B. Examples of UI devices that may be used are discussed in more detail later.

Although some service areas may not include a sensor, the equipment in each of the service areas A and B includes one or more sensors, although the sensors in these two examples are implemented in somewhat different ways. In room A, the sensor 15A is an element of one or more of the lighting devices 11A. In room B, The sensor 15B is implemented as a standalone system component. Such sensors may detect a condition that is relevant to lighting operations, such as occupancy, ambient light level or color characteristics of light in an area or level or color of light emitted from one or more of the lighting devices serving the area. Other sensors may detect other conditions that are relevant to other functions of the system or for more general communication about conditions in an area for still further purposes, such as temperature or humidity for HVAC control or vibration for reporting of earthquakes or similar events. Other examples of conditions that may be detected by appropriate sensors include a security condition, an accident/collision detection, an object/occupant identification, etc. Different sensors for different types or sets of conditions may be relevant in different system installations, e.g. some of these examples might be more relevant in warehouse type system applications. For purposes of further discussion of FIG. 1, however, we will focus on implementations that include sensors for purposes related to lighting operations of the system 10.

The lighting devices 11A, the lighting controller 13A and the sensor 15A (if provided in one of the lighting devices 11A) are located for lighting service of the first service area, that is to say, for controlled lighting within room A in the example. Similarly, the lighting devices 11B, the lighting controller 13B and the sensor 15B (if provided) are located for lighting service of the second service area, in this case, for controlled lighting room or other type of area B.

The equipment in room A, in this example, the lighting devices 11A, the lighting controller 13A and the sensor 15A in one of the lighting devices 11A, are coupled together for network communication with each other through data communication media generally represented by the cloud in the diagram to form a first physical network 17A. Similarly, the equipment in second area B, in this example, the lighting devices 11B, the lighting controller 13B and the sensor 15B, are coupled together for network communication with each other through data communication media generally represented by the cloud in the diagram to form a first physical network 17B.

Many installations will include equipment for providing lighting and other services in a similar manner in other rooms and/or other types of services areas within or on a particular premises 12, such as in a building or on a campus. Although not shown, in similar detail, such other service areas are represented generally by Room C to Area N in the example illustrated in FIG. 1.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition light for an organism. A lighting device, for example, may take the form of a lamp, light fixture or other luminaire that incorporates a source, where the source by itself contains no intelligence or communication capability (e.g. LEDs or the like, or regular light bulbs of any suitable type). Alternatively, a fixture or lamp may be relatively dumb but include a source device (e.g. a light bulb) that incorporates the intelligence and communication capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises 12 served by a system 10 has other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of light emitting unit.

In the examples, the intelligence and communications interface(s) and in some cases the sensors are shown as integrated with the other elements of the lighting device or attached to the fixture or other element that incorporates the light source. However, for some installations, the light source may be attached in such a way that there is be some separation between the fixture or other element that incorporates the electronic components that provide the intelligence and communication capabilities and/or any associated sensor.

The example of system 10 utilizes intelligent lighting devices. Hence, each lighting device has a light source, a processor, a memory and a communication interface. By way of an example, one of the lighting devices 11A is shown in expanded block diagram form, as represented by the dashed line box at 11A'. As shown by that expanded example, each device 11A in room A includes a light source 19A, a processor 21A, a memory 23A and a communication interface 25A. In service area A, at least one of the lighting devices 11A' includes the sensor 15A, as well. The drawing also shows one of the lighting devices 11B' in expanded block diagram form. As shown at 11B', each lighting device 11B includes a light source 19B, a processor 21B, a memory 23B and a communication interface 23B.

The sensors also have associated intelligence and communication capabilities. In the example of room A, the intelligence and communication capabilities associated with the sensor 15A are those of the host lighting device 11A. In the example of room or other service area B, the sensor 15B is a standalone device incorporating its own associated intelligence and communication capabilities, as will be discussed in more detail, later.

The UI devices serving as the lighting controllers in this example also are implemented as smart/intelligent devices with processing and communication capabilities. Hence, each lighting controller includes a processor, a memory and a communication interface, as well as one or more input and/or output elements for physical user interaction. As shown by way of example, the UI device serving as lighting controller 13A in room A includes a processor 31A, a memory 33A and a communication interface 35A. The UI device serving as lighting controller 13A also includes one or more user input and/or output elements represented generally by user I/O element 37A in the drawing. The element 37A, for example, may include a toggle switch, a rotary controller, one or more sliders, a keypad and/or a touchscreen display. A touchscreen display, for example, may support touch and touch gesture input as well as visual display output. Other examples of the UI input may include a video input and associated processing for gestural control detection, a microphone, an occupancy/motion sensor, proximity sensor, etc. Outputs may be visual, audible, tactile, etc. For example, a microphone and/or speaker may be used to support audible input and/or output, whereas a camera in combination with projector or display may be used to support visual input and/or output. As shown by way of example, the UI device serving as lighting controller 13B in service area B includes a processor 31B, a memory 33B and a communication interface 35B. The UI device serving as lighting controller 13B also includes one or more user input and/or output elements represented generally by user I/O element 37B in the drawing. The element 37B, for example, may be similar to the I/O element 37A in UI device 13A, examples of which were discussed earlier. Of course, other elements may be used to receive input from and/or provide output to a user, in any of the UI devices/controllers 13A, 13B.

As outlined earlier, in the example of FIG. 1, any sensors included in the system 10 also have or are associated with intelligence and communication capabilities. The sensor 15A is integrated into a lighting device; and the processor, memory and communication interface of that device provide the intelligence and communication capabilities associated with that sensor 15A. The sensor 15B, however, is a stand-alone device and includes its own individual intelligence and communication capabilities.

The sensor 15B includes a physical condition detector (D) 41B, which is the actual device that is responsive to the particular condition to be sensed. The detector 41B may receive a drive signal; and in response to the sensed condition, the detector 41B produces a signal having a characteristic (e.g. voltage magnitude) that is directly related to a characteristic level of the sensed condition. The sensor 15B also includes a detector interface circuit (Int.) 43B. The circuit 43B provides any drive signal that may be needed by the particular device type of physical condition detector 41B. The detector interface circuit 43B also processes the output signal from the detector 41B to produce a corresponding output, in a standardized data format, for use by the associated intelligence. The integrated sensor 15A in lighting device 11A may be implemented by a detector and interface circuit analogous to the physical condition detector 41B and the detector interface circuit 43B.

The standalone implementation of a sensor 15B also includes a processor 47B and an associated memory 47B. The sensor 15B also includes a communication interface 49B, typically similar to or complimentary with the interfaces 25B and 35B used by other devices 11B or 13B in the particular service area B.

Although not shown for convenience, there may be multiple communication interfaces for data communication over multiple media in any one system element (e.g. wider area network over Ethernet and local communication for example on WiFi or Bluetooth or Zigbee or DMX etc.).

Some of the intelligent system elements, e.g. lighting devices, UI devices or sensors, may have or be enhanced with audio or video input or output equipment. A sensor, for example, may include a camera and/or a microphone as the detector(s). A UI device may include a display for output and may include a camera for user input, alone or in combination with other user input elements. For example, a UI device arrangement might utilize a touchscreen alone or in combination with a camera. Alternatively, a UI device may utilize a microphone for audio input alone or in combination with a speaker for audio output to the user. Audio and/or video sensing as well as audio and/or video output capabilities also may be incorporated into enchanted lighting devices. Such a lighting device, for example, might have or connect to a speaker and a projector to provide audio-visual information output. A microphone and/or camera in an enhanced lighting device might provide area monitoring and/or additional form(s) of user input to the system for lighting or other purposes.

Although not shown, each of the system elements that uses power to operate as described will include a power supply circuit and will connect to or possibly contain a power source. The lighting devices 11A and 11B may draw power from an AC grid or from a DC grid. The lighting devices 11A and 11B, for example, may draw power from alternating current (AC) mains in the building or other type of premises where the system 10 may be installed. In an AC grid type example, the power supply circuit of a particular lighting device 11A or 11B will include a light source driver circuit to process power drawn from the AC mains in any manner as may be appropriate to drive the particular type of light source incorporated in the particular lighting device. The source driver may be a simple switch controlled by the processor, for example, if the source is an incandescent bulb or the like that can be driven directly from the AC current. As another example, the drive circuit may convert AC power to one or more appropriate DC voltage and/or current levels to provide power to DC driven light source(s) such as light emitting diodes (LEDs). The power supply would also process AC power from the mains to provide voltage and/or current levels to power the elements (e.g. processor, memory and interface) serving as the device intelligence and for the communication interface.

In the example, the power supply circuit for each lighting device receives electricity from AC mains, however, one or more of the lighting devices for each service area may be driven by a battery or other power source for a particular application. For example, one or more lighting devices in each room and one or more lighting devices in a corridor each may have or connect to a back-up battery or other back-up power source to supply power for some period of time in the event of an interruption of power from the AC mains.

Other system elements in each service area, such as lighting controllers or other user interface devices and/or any standalone sensors would likewise include appropriate power supply circuits, which may rely on AC or DC power from the mains, battery power and/or ambient power harvesting, etc. as needed to operate the components of each respective system element. Examples of ambient power harvesting include vibration responsive power generation, photovoltaics, mechanical work (e.g. EnOcean), etc.

As noted, system elements within a room or other service area are coupled via suitable links for network data communications, as represented generally by the network clouds 17A and 17B. The system 10 also includes communication links coupling the first and second physical networks into a wider area network. The local service area networks 17A, 17B may be relatively distinct from each other and distinct from but coupled to a wider area network as shown generally at 51, or the networks may be relatively unified. Various network media and protocols may be used for the data communications. The networks 17A, 17B allow elements within respective service areas A and B to communicate with each other, and the links or couplings 49A, 49B of those networks to the wider area network 51 allow the elements within each of the service areas to communicate with elements in other service areas and/or to communicate with other devices generally represented by way of example by the server/host computer 53 and the user terminal device 55.

The host computer or server 53 can be any suitable network-connected computer, tablet, mobile device or the like programmed to implement the desired functionalities. Such a device may have any appropriate data communication interface to link to the wider area network 51. If provided, a host or server computer at the premises may utilize the same networking media 17A or 17B and/or 51 utilized by the on-premises system elements. The external host or server 53 may provide various functions in support of system operations and/or utilizing data from system elements. For example, on-site processing capability may be enhanced or redundancy may be built in for the system, by utilization of off-site computing resources.

The user terminal equipment such as that shown at 55 may be implemented with any suitable processing device that can communicate and offer a suitable user interface. The terminal 55, for example, is shown as a desktop computer with a wired link into the wide area network 51. However, other terminal types, such as laptop computers, notebook computers, netbook computers, and smartphones may serve as the user terminal computers. Also, although shown as communicating via a wired link from the wide area network 51, such a device may also or alternatively use wireless or optical media; and such a device may be operated at the premises 12 and utilize the same networking media 17A or 17B utilized by the on-premises system elements.

The wide area network 51 may take the form of a local area network (LAN) and/or a wide area network (WAN). Hence, the premises may include a LAN or other on-premises network, or the communications may go directly to a particular WAN. Alternatively, there may be a LAN or other network formed within the premises, but without a coupling or connection to a yet wider area network outside the premises, for example, to restrict access and therefor increase security of the lighting network and the like within the premises. A LAN/WAN combination, for example, may provide communications capabilities inside and outside the premises in a manner generally represented by the network 51 in the example of FIG. 1. Depending on the network media and protocol(s) used, the LAN may include a frame switch, a packet router or the like providing LAN interconnectivity. Although not shown, a gateway or the like may also be deployed on the LAN to provide various functions in support of interconnectivity of the LAN to/from the WAN.

The LAN functionality, however, may essentially be embedded in the room or area elements, except for the interconnecting media. For example, any of the system elements in each room or other service area may provide connectivity and switching/routing functions to interconnect the system elements via the applicable media to form a LAN on the premises 12. Also, one of the elements in a room or area may provide the interface to any external WAN. Hence, although shown separately for convenience, the elements that form the LAN may be integral with the lighting devices, etc. of the lighting system in the rooms or other types of areas serviced by the illustrated system. Alternatively, all intelligent system elements may connect directly to the WAN. If the elements all connect through the WAN to a "cloud" service, the communication between elements could occur via exchange through the cloud server.

The WAN communication capability, particularly if the WAN is a relatively public network such as the Internet, may allow various parties to access the lighting network and the system elements that communicate via the network. For example, the enterprise or other entity that operates the premises may access the system remotely. Also, a provider of some or all of the lighting system equipment and network may access the element or elements of the system that they provide, e.g. for monitoring, maintenance or other system service.

The LAN as discussed here need not be a LAN of the type typically used today for computer or mobile device communications within a particular premises, although the lighting system may use or connect to such a network. For purposes of the present discussion, the LAN is a premises network for data communications among the elements discussed herein as part of the lighting system and/or using the associated networking capability of that system for communications within the premises.

Each element communicating via the premises networks that form part of the lighting system 10 have one or more addresses or identifiers, to facilitate communications via the particular media used for the networking and/or to identify each device to other devices on the system or outside the system with which each device may communicate. For example, if Ethernet is used, each device may have a media access control (MAC) address assigned to the Ethernet interface within the respective device. Each device may also have an Internet Protocol (IP) address assigned thereto. Depending on the interface of the LAN to the outside world, each device may have an internally assigned IP address, which a firewall or network address translation (NAT) device translates as appropriate when the device communicates via the WAN. If a device communicates with the WAN more directly, it may receive an IP address that is useable on the WAN, although if the address space is still that of IPv4, such an address would likely be assigned on a dynamic basis only for as long as the particular device in the premises may need the address. Each device will also typically have some form of electronic serial number for identification purposes, although there are a variety of different types of such identifiers that may be used for some or all of the devices that communicate via the illustrated system and its network media. Another approach might utilize cellular network type addressing and identification, in which case, each device might have an assigned cellular telephone number and an electronic device identifier such as an International Mobile Subscriber Identity (IMSI) or the like Although not shown, there may an additional layer of networking and/or control, between the LAN and the WAN. For example, an enterprise having a wide geographical operation at multiple locations may have LANs at each building or campus and an enterprise-wide intranet interconnecting those locations. If desired (and security is not an issue), the enterprise-wide intranet could provide the access/connectivity to the Internet. For enterprise monitoring and control, the enterprise-wide intranet would facilitate communications for other servers and/or user terminal devices of enterprise personnel to communicate with the equipment at each location that is on the respective lighting network LAN.

For various reasons, the communications capabilities provided at the premises 12 may also support communications of the lighting system elements with user terminal devices and/or computers within the premises. The user terminal devices and/or computers within the premises may use communications interfaces and communications protocols of any type(s) compatible with the on-premises networking technology of the system 10. Such communication with a user terminal, for example, may allow a person in one part of the premises 12 to communicate with a system element in another area of the premises 12, to obtain data therefrom and/or to control lighting or other system operations in the other area.

For some lighting system functions discussed more, later, it may be useful to include one or more central overseer (CO) functionalities, in or logically associated with the premises 10. Such a CO functionality provides centralized management of relevant system functions, for example, to assist in set-up of various logical relationships during provisioning and/or configuration of newly installed or repaired system elements in the various service area(s) of the premises 12. Stated another way, such a CO type functionality collects and/or distributes element configuration data during intelligent system element commissioning operations. For example, one CO may be set-up as a floor CO, another CO may be set-up as a building CO, etc. An another example, one type of CO (deployed as one or more instances) may serve as a "sensors" overseer that has information about sensors on the system. Likewise, the system could have overseers for "luminaires," "control interfaces," "third party devices," etc. Some installations may also include CO of COs to help with higher level groupings amongst various COs.

A CO and/or central controller may also assist in determining resource availability for distributed processing. Rather than query the other element directly, the CO or other central controller might have additional information regarding which devices should/can be accessed (e.g. load balancing/prioritization/management, management of policies and/or software licenses, etc.); and the element having the job to distribute could then query the CO or other central controller to obtain information about elements and/or resource availability of other system elements for use in distributing tasks to the other elements.

At least some functions of the system 10 may rely on a central controller service, which essentially provides central lighting control function of the system. Such a central lighting control function of the system, for example, may control all lights on a floor or the like under certain conditions (e.g. to turn all lighting except emergency lighting off after hours or to turn on lighting in a manner to lead people to exits in the event of a fire) or to monitor and process all data from sensors of a particular type. Central controller functionalities could be separately implemented, but in the examples are combined with the data management and commissioning assistance functions in one or more COs 57. Another example of an overall processing function of the system is a centralized communication related function, such as a gateway, firewall, network address translation (NAT) function, or the like, e.g. to support the communication with an external wide area data communication network. Although separate hardware could be included for one or more of these centralized overall processing functions of the system 10, several of the examples discussed more fully below implement such functions on a distributed processing basis utilizing memory and/or processing resources of the various intelligent elements of the system 10.

The external elements, represented generally by the server/host computer 53 and the user terminal device 55, that may communicate with the system elements at the premises 12 may be used by various entities and/or for various purposes in relation to the lighting system 10. For example, a terminal such as 55 may allow personnel of an entity that operates the premises to monitor operations of lighting and other systems at the premises and/or make adjustments, remotely.

As another example of use of external communications, a server or a combination of server and terminal device may be operated by a service company, for example, a lighting system service company. Such a service provider may use the external computer equipment 53 and/or 55 to remotely monitor health of the elements of the lighting system 10 at the premises 12 and remotely provide related services to the entity owning or operating the premises, such as troubleshooting, software corrections/upgrades or the like via communication via the Internet or an Intranet with the lighting system on the particular premises. In such an example, the provider's service functionalities may be considered as being out in the 'cloud.'

As shown, the networks and elements of the system 10 in the premises 12 are accessible from the outside, and this accessibility also may make information from within the lighting system at the premises 12 available to outside parties, e.g. the power company, NOAA, etc. For example, the system can provide sensor data and/or data about operating conditions of various elements at the premises 12 to such other parties.

Various circuit elements (e.g. processor devices, memories and associated architectures) may be used to implement the intelligence of the various lighting system elements in the rooms or other services areas. Also, the communications within the rooms and other services areas as well as the communications to and of the wider area network all may use various different types of data networking media and protocols. As a result, various types of one or more communications interfaces may be incorporated into each of the various lighting system elements in the rooms or other services areas and/or remote devices in communication therewith, depending on the particular media and/or protocol to be used in a particular premises or service area thereof.

The drawing shows one or more combined central overseer (CO) and lighting controller services 57 in or coupled to the network 51 but generally within the premises 12 (bottom middle of the drawing), by way of an example. However, the CO 57 is shown in dotted line form as it may not actually be implemented using a separate hardware element. Instead of providing a general purpose computer as a host or server for the particular CO and controller service application, the CO and controller service functionality is illustrated here as an example of a type of functionality that the system 10 may implement on a distributed processing basis, in programming executed by processors and/or using memories of some or all of the intelligent elements of the lighting system 10, such as the lighting devices, user interface (UI) devices, sensors, etc., for example, as installed in the various service areas A to N at the premises 12.

The network links within the service areas, amongst the areas of the premises 12 and from the premises 12 to the part of the network 51 that may be outside the premises 12 all may utilize any convenient data communication media, such as power lines wiring, separate wiring such as coax or Ethernet cable, optical fiber or wireless (e.g. Bluetooth or WiFi). Some or all of the network communication media may be used by or made available for communications of other gear, equipment or systems within the premises. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system or may already be present from an earlier data communication installation.

Within one room or other type of service area, the system might use one, two or more types of communication media. Similarly, to interconnect equipment in various rooms or areas and in turn connect such elements into a broader network, the system may use one, two or more types of communication media. Use of multiple communication media, for example, might help to optimize bandwidth throughput, cost and/or security. As a more specific example, an application or function needing low latency communication between devices that are physically close may use one media for the local connection, but one of the devices at other times may need to send large amounts of data to a remote location for processing via a different wide-area media with faster data transport capabilities.

A particular intelligent system element may act as a router or the like to connect elements in one or more areas to the data communication media of the LAN providing communication service to other parts of the premises. The LAN interconnectivity function may be implemented in one of the lighting devices, user interface devices or sensors or other-purposed devices within a service area. Alternatively, some areas or groups of areas may utilize an additional gateway hub (not separately shown) to provide the LAN connectivity. The gateway hub in this later type of example is a device that provides communications capabilities and is not itself configured as a device of one of the other types. A gateway hub may support communications capabilities to and from some or all of the other devices within the room or service area. In some examples, one of the other elements in the room or service area may support the communication outside the room or area. In other arrangements, the hub gateway provides the external network communications capabilities, although in some cases is does support the local intra device communications whereas in other examples the hub gateway does not support the local intra device communications. A gateway hub might also support other, non-lighting capabilities (e.g. memory, processing power, etc.).

Also, in most of the examples, the elements of one room may be networked together and connected to the broader area network; however, in some examples at least, it may be more effective to connect the elements in two or more rooms together and provide a connection thereof to the broader area network. The system elements will have stored therein provisioning data to enable physical communication through the network communication media, amongst the elements via the on-premises data communication network media and in some cases via the portion of the network 51 that may be outside the premises 12.

In addition to physical networking, such a system 10 associates various elements/components of the system in a number of 'logical' ways. Logical associations into groups of "sub-networks" allow elements to be linked together, for example, based on a control grouping, based on similar properties, based on proximity, a variety of other criteria and/or combinations of any or all such properties. As one example, devices within one room or other type of service area that are to be operated in some unified manner (e.g. to light the room or area) may be linked together in one logical "Room" sub-network.

As more specific Room network example, although generally similar in many respects, one of the devices in a room or other service area may be configured as a 'leader' unit whereas other system elements in the particular room or other service area may be configured as 'follower' units with respect to the designated leader. These relationships, however, are relatively dynamic and readily configurable. For example, programming of the devices/elements in the system provide automatic/autonomous discovery at installation; and an initial set-up routine uses results of the discovery process to set-up logical relationships between devices, for example, including selection of a device as a leader unit.

However, at a later time, if the leader unit is impaired or off-line, the network is self-healing in that some or all of the set-up routine can be run again to select a replacement as a new leader unit from among the other devices that are operational on a particular part of the network. Alternatively, the system may have fallback plan in place, in which one or more other elements are pre-designated to take over the role of the leader in the event of failure or impairment of the initially selected leader. Effectively, such an arrangement may identify a first in command (leader), a second in command, etc.

Of course, there may be a variety of other types of sub-networks established amongst elements of the system 10 within the premises 12. For example, all of the wall controller type user interface devices in a building might be logically linked in one grouping as a "Lighting Controller" sub-network, to offer the ability to create an overall view of the lighting operations users have selected throughout the building. This overall view might be helpful in determining how people interact with the lighting system and thus help identify pain-points in the lighting control(s) setup. Such an overall controller view may also be helpful in remote access, for example, to offer a control service in which a user can control lighting system in Room A from Area N's control interface as though that user were in Room A. As another example, all sensors (or all sensors of one type) may be linked together in a logical grouping to allow reporting of one or more detect conditions on an overall basis across the premises or some portion (e.g. one floor) thereof. At least some of these sub-networks that extend over multiple service areas may include a central controller and/or CO service.

Also, logical networks may be networked together for some purposes, e.g. so that a function of one logical sub-network may influence an operation within another logical sub-network. For example, if enough controllers indicate that lights have been turned to a particular level, other lights not to that level yet in other rooms areas may be similarly adjusted. One or more linked networks can affect each other and possibly still other logically networked elements. For example, if >x % of the occupancy sensors in an area or space (e.g. floor or building), then the space is considered "unoccupied." If >y % of the lights are OFF, then the enterprise office formed by the space is considered "closed." If the space is both "unoccupied" and "closed," then the system can turn down the HVAC for the space and turn ON the security system.

The examples discussed more later encompass a variety of techniques for implementing CO, central controller or other functions on a distributed processing basis using processing and/or memory and/or software resources of the intelligent system elements. Other relevant resources for sharing in distributed processing might include input/output, networking, or any other resource. This includes resources that an individual device has (near) exclusive access to (e.g. one fixture might have a remote sensor, but the sensor is "dumb" and isn't on the lighting network).

Different types of resources and/or more of these exemplary resources may be appropriate for sharing in distributed processing, depending on the level of questions being asked or tasks been processed. For relatively low level questions or tasks, the requestor may supply everything, such as the data, instructions, etc., as part of the work packet. In such a low level example, the remote element receiving the task to process just executes the instructions on the received data. For more complex tasks, it may make sense if the software was pre-installed on the remote element and the requestor sends basically just the data that needs to be processed through execution of that software. At still a higher level, the requestor may assign a task a question such that the other system elements need to pull in some of their own data to answer. For example, a video camera might be sending frames out and ask other devices to seek and identify any people in the frame. The other devices may need to pull data from their cameras, and/or pull facial recognition databases from some external server.

Additionally, a particular system element might have exclusive access to resources that no other element has access to. For example, if only one light fixture has a hardwire to the Internet, it may be able to pass work packets on to servers or pull data from servers via that Internet connection. As another example, one or some relatively small number of system elements may already have installed software of a type particularly useful in certain types of distributed processing tasks. For example, image processing software may be preinstalled on some elements, therefore it might be preferable to send jobs to those units.

Several examples of distributed processing functions involve distribution of task or job processing to utilize resources of two, three or more of the intelligent elements of the system 10. Such a distributed processing operation involves and originating or distributing element, that has a task amenable to distributed processing, as well as one or more other the responding or receiving elements that offer/provide their memory or processing resources for use in the particular distributed processing operation.

For example, when one intelligent system element has a processing job to perform using resources of other intelligent elements, the one element can query the other elements of the lighting system and receive responses from the other intelligent elements of the lighting system as to whether or not the other intelligent elements of the lighting system have processing or memory resources available for the processing job. Based on the responses, the one intelligent element allocates portions of the processing job to some number of the other intelligent elements of the lighting system. The one intelligent element can then send data and instructions to each element of the other intelligent elements among that number, instructing each receiving element to perform an allocated portion of the processing job. AS the other elements complete their allocated portions of the job, the one intelligent element receives from those other intelligent elements results of the performance of the allocated portions of the processing job. The one intelligent element can then process the received results to determine an overall result of the processing job, and if appropriate, perform some action based on the overall result of the processing job.

From handling of each job in this manner, an intelligent element of the system 10 may learn of the other elements that offer resources and of the performance of those elements on portions of jobs distributed thereto. By analyzing metrics of the job distribution, and storing the analysis results, the originating element can refine its distribution process for each successive job as the originating element attempts to use resources of other intelligent elements.

In a another example of distributed processing, but from the perspective of one of the intelligent elements that makes its resources available for processing of a portion of a job from another element, the one intelligent element may receive an inquiry from the other intelligent element that has the processing job to perform on a distributed basis. In response, the receiving element may send a response with information identifying one or more of its various resources, e.g. resources of its processor, memory, software resources, etc., as available for distributed processing, via the network, to the other intelligent element. The element with the available resource(s) in this example receives data and/or instructions for performing a portion of the processing job from the other intelligent element via the network. The element will then process the received data in accordance with the instructions using the relevant available resources of the lighting device and send a result of the processing via the network to the other intelligent element.

Somewhat like the originating element, the job receiving element can analyze metrics of job processing and store analysis results to effectively learn about the impact of offering resources for processing of jobs from various other elements in the system. In this way, the element receiving an inquiry about available resources can adjust its responses to future inquiries from the other devices, e.g. to not respond or to offer less of its available resources to particular requesting elements.

As another distributed processing example, if the system is arranged to utilize a client server model for some functionalities, e.g. for an external communication function, for a CO and/or for a higher layer control service, etc., the server providing a particular functionality may be implemented on a distributed basis, e.g. with instances of the respective server functionality running in coordinated fashion on two or more of the intelligent system elements in the premises 12. Since the higher level controllers may be implemented as individual hardware or as program functions of other intelligent elements of the system 10, they are considered as controller services, for purposes of further discussion herein. However, in view of our focus on distributed processing, we will assume that most if not all of these centralized functionalities that may be implemented as servers will be implemented using multiple server instance distributed processing; and many such examples below will utilize the higher layer control service(s) as principal examples of services implemented via such distributed server processing.

By way of an example of server types distributed processing, the system 10 implements one or more of the services 57 on a distributed basis. In an example of this later type, the lighting system 10 also includes two instances of server programming. Although shown for convenience in dotted line fashion as if separate server platforms in FIG. 1, the two instances of the server for the CO/controller/communication service 57 are actually stored in the memories of respective first and second ones of the intelligent system elements for execution by processors of the first and second intelligent system elements. The two instances of the server programming 57 configure the first and second intelligent system elements to operate in a distributed processing fashion to implement a server function with respect to an overall processing function of the system and related server communications via the data communication network. Such a system may also include client programming stored in memories of intelligent system elements other than the first and second lighting devices for execution by processors of the other intelligent elements to configure each of the other intelligent elements to implement a client function with respect to the particular overall processing function of the system and related client communications with the server function implemented by the instances of the server programming 57 on the first and second intelligent elements.

As shown by the discussion of the components of the system 10 so far, system elements in each service area include intelligence as well as communications capabilities. The precise operations of such a system can be defined by provisioning and/or configuration data stored in and used by the various intelligent system elements. In the examples, provisioning data is data used to set-up or enable operation of a system element so as to communicate via at least a portion of one or more of the networks of the system 10 and though such networking to communicate with some or all of the other elements of the system. In addition to communication via the physical network, elements of the system 10 can be logically associated to form logical groups or logical sub-networks, for a variety of purposes. In the examples, configuration data is data used to establish one or more such logical associations.

As used herein commissioning encompasses various functions to set-up elements of the system for operations. Examples of functions involved in commissioning include provisioning elements for network communications, e.g. for physical communication with other elements via the applicable network media. Provisioning often entails at least some storage of data (sometimes referred to as provisioning data) for use in such communications within each system element. Some provisioning data also may be stored in an element implementing a routing or central network control function, e.g. to facilitate network-side aspects of the physical communications. Examples of functions involved in commissioning also include configuration of system elements to associate elements in one or more logical groupings of 'sub-networks,' to facilitate functional operations of the associated system elements. Configuration also will typically entail storage of data (sometimes referred to as configuration data) in the elements being associated in a particular logical group or sub-network. For example, the data stored in an element may identify one or more logical groupings to which the particular element belongs. Some configuration data also may be stored in an element designated to implement a central overseer type control function.

In the example of FIG. 1, provisioning data is stored in the memories 23A of the first lighting devices 11A and the memory 33A of the first lighting controller 13A to enable physical communication among the first lighting devices 11A and the first lighting controller 13A via the network 17A and to enable physical communication of the first lighting devices 11A and the first lighting controller 13A via the wider area network 51. Configuration data is stored in the memories 23A of the first lighting devices 11A and the memory 33A of the first lighting controller 13A for logically associating the first lighting devices 11A and the first lighting controller 13A together to operate as a first area lighting system, in this example, providing lighting service to the room A. Since the sensor 15A is implemented as an element of lighting device 11A', the provisioning and configuration data of that device 11A' facilitate communications via the networks 17B and 51 regarding sensor operations as well as operations of the sensor as part of the first area lighting system.

In a similar fashion, provisioning data also is stored in the memories 23B of the second lighting devices 11B and the memory 33B of the second lighting controller 13B to enable physical communication among the second lighting devices 11B and the second lighting controller 13B via the network 17B and to enable physical communication of the second lighting devices 11A and the second lighting controller 11B via the wider area network 51. Furthermore, configuration data is stored in the memories 23B of the second lighting devices 11B and the memory 33B of the second lighting controller 13B for logically associating the second lighting devices 11B and the second lighting controller 13B together to operate as a second area lighting system, in this example, providing lighting service to the room or other type of service area B. Since the sensor 15B is implemented as a standalone device, similar provisioning and configuration data is stored in the memory 47B of the sensor 15B, to facilitate its communications via the networks 17B and 51.

In addition, configuration data is stored in the memories of at least one of the first lighting devices 11A and the first lighting controller 13A and stored in the memories of at least one of the second lighting devices 11B and the second lighting controller 13B to logically associate the elements storing such data in respective memories together to operate as a system for a predetermined function for both the first area A and the second area B. For example, such configuration data may be stored in the lighting controllers 11A, 11B to group the controllers together, so as to coordinate a lighting status repotting function. Sensors of a particular type, e.g. temperature, ambient light level and/or occupancy, also may be grouped together for a common reporting function or to provide a common influence with respect to lighting or some other operation or function associated with the building premises.

The provisioning and/or configuration data may be stored into the memories of the various system elements via a variety of procedures. For example, one or both types of data may be manually input by a technician with a terminal device, as system installation or as new elements are added to an existing installation. Alternatively, the provisioning and/or configuration data may be acquired by a system element and updated in other system elements via an autonomous commissioning procedure in which the elements communicate and determine each others' capabilities. The commissioning also may lead to storage of at least some of this data in a central overseer (CO) service functionality, such as the server instances 57, and then provided to assist in commissioning of a new element on the system or in reconfiguration or corrective configuration of an existing element of the system.

The lighting device will include a 'brain' or central processing unit (CPU) component, which essentially includes the processor and memory (see examples in FIG. 1). Although not separately shown in FIG. 1, the lighting device also may include one or more standard connectors for coupling of other components to the 'brain' of the device. The CPU component may include the one or more communications interfaces, or the communications interface(s) may be provided via a separate component/board/module. If built on a personal computer like design, for example, a light fixture might include one mother board that has the CPU circuitry, an Ethernet port, a WiFi transceiver and one or more USB ports and a coupling to connect to a standard light driver. However, each lighting device (e.g. enhanced fixture or luminaire in our examples) could utilize the same mother board, although different implementations/product offerings could incorporate different light sources coupled to the light driver port and/or different enhancements (e.g. sensors, or input/output devices coupled to the USB port(s)).

As products sold to customers, the lighting equipment manufacturer could offer a range of lighting devices with a wide range of capabilities at various price points. However, across such products, many elements of the devices, including the 'brain' and the communications elements and other interfaces, would be essentially the same. Interfaces configured for standardized modular plug-in coupling could be provided in such devices to facilitate easy addition of various enhancements, such as sensors, input and/or output devices (e.g. for audio and/or video), extra memory, extra processor(s), additional communication components, etc. Plug-in here may utilize a physical and electrical connection or utilize some other type of coupling, e.g. capacitive or inductive. Any plug-in module that may require the 'brain' of the device to run additional programming for the device to be able to utilize or work with the plug-in module could have the requisite programming stored in memory in the module. In such a case, the 'brain' of the device and the module would be configured to upload the requisite programming from the memory of the plug-in module to the memory of the device, when the module is installed in the device. Alternatively, installation of the plug-in module could cause the processor of the device to communicate via network with an appropriate server to obtain any programming that may be required for proper device operation with the newly installed module.

A PC based approach may be based on any microprocessor architecture such as a Reduced instruction set computing (RISC) using an ARM architecture, as commonly used today in mobile devices and other portable electronic devices, or a microprocessor architecture more commonly used in computers such as an instruction set architecture (ISA), like those used in Intel microprocessors and the like.

The PC-like or other microprocessor based approaches are discussed by way of examples; and other processor implementations may be used, such as based on a Peripheral Interface Controller (PIC) or other microcontroller architecture. Alternative intelligent architectures for the intelligence of the devices, however, will still include appropriate communication interfaces and couplings for light sources and may include other standardized ports for connections of sensors, user input/output devices, etc.

The sensor elements (S) of the system (see 15B in FIG. 1) may have electronics somewhat similar to those of the lighting devices discussed above, particularly with respect to the 'brain' and the communication interface(s). The sensor elements, however, may include USB or other port(s) for coupling to physical detector elements and associated interface electronics (Int.) built to the selected interface standard (e.g. USB). The user interface (UI) devices likewise may have electronics somewhat similar to those of the lighting devices discussed, above, particularly with respect to the 'brain' and the communication interface(s); although UI devices may incorporate or have ports for particular types of user input/output components.

Although not separately shown for convenience, the intelligent system 10 may include and/or provide at least communications for a wide variety of other types of intelligent system elements in any or all of the rooms or other types of service areas A to N. Some of the other elements may be sold by the vendor that provides the lighting devices, sensors and user interface devices and associated intelligent element programming but be configured for other purposes. Others of such additional system elements may be manufactured and sold by other third party entities. All of these other elements that may be part of the system and/or may be communicating through the system will include some intelligence, such as some form of processor and memory; and such other elements will include communication interfaces and implement protocols compatible with the data communication networking of the system 10 at the premises 12. In some cases, third parties' system elements may themselves be 'lighting' related, such as lighting controllers, but manufactured by parties other than the vendor that manufactures the overall system and most of the components thereof. As another example, the other intelligent system elements may be controlled devices and/or user interfaces or controllers for other types of equipment, e.g. HVAC and/or any industrial/commercial equipment running on the premises, whether or not manufactured by parties other than the vendor that manufactures the overall system and most of the components thereof. As still further examples, the other intelligent system elements may be security system devices, building access control device, inventory control monitors, location/positioning devices (e.g., indoor "GPS") or any device using the lighting network as a communication backbone.

As shown in the discussion above, the room controller typically will be an actual device, such as UI device 13, 13B in our examples. A floor and/or building controller and any associated CO functionality could be a hardware device somewhere in the system 10; but in our examples, such a broader area controller may be implemented as processing functions or services on one or more system elements deployed for other purposes. Since the higher level controllers may be implemented as individual hardware or as program functions of other equipment, they are considered as controller services, for purposes of further discussion herein. However, further discussion of such services will focus on the exemplary distributed processing implementations thereof.

For example, a lighting device 11A', 11B' having or enhanced with appropriate memory and processing capacity may be programmed to function as a floor controller as well. To other elements on the floor, this lighting device enhanced with the controller service programming would appear on the network as a server, with respect to client programming implemented by the system elements, included within the floor control grouping or sub-network. If the system is arranged to utilize a client server model for such control functionalities, the server providing the floor or building level control may be implemented on a distributed basis, e.g. with instances of the respective server functionality 57 running in coordinated fashion on two or more of the intelligent system elements in the premises. In our example, of the lighting device acting as the server for the floor controller function, that device would run one instance 57 of the applicable controller server programming. At least one additional instance of that programming would run on another intelligent element, such as another lighting device, a UI device or a sensor. If occasion arises when one or both instances of such a functionality might require additional resources, at any such time the controller service server instance may distribute controller related tasks to other elements as discussed relative to FIG. 2. Although the floor controller service is used by way of an example here, a building controller service or a higher level controller service (e.g. campus or enterprise wide) may be similarly implemented via distributed processing on intelligent elements of the system 10.

The configuration data stored in the intelligent system elements that are subject to the higher level controller service(s) would include a priority relationship as between any such higher level controller services and the respective room controllers and/or any sensor responsive control functions implemented in respective individual system elements. For example, at least for some types of installations, a command from a floor controller may override any command from a room lighting controller (from a local UI device) and override any lighting device setting established in response to a condition detected by a sensor. A building-wide controller service would have priority over any floor controller services in the building, as well as over the room controllers and the sensor responsive control functions. The floor and/or building control services may also allow interaction with other computers and/or terminal devices, such as elements 53 and 55 in the example of FIG. 1. The algorithms set at each level of the control hierarchy, however, may be varied and may be chosen by the system designer, the premises owner or the entities that will occupy some portion(s) or all of the service areas in the premises 12; and the priorities set amongst the system elements during commissioning may in at least some premises be similarly set by the system designer, the premises owner or the entities that will occupy some portion(s) or all of the service areas.

One or more CO/controller services may be for or include an associated system maintenance capability. Some or all of the elements of the system would then provide information to that CO/controller as may be appropriate for system health monitoring. For example, a lighting device in a room may determine that it has not heard from a sensor in its room for some extended period of time and report to the maintenance CO/controller so that that CO/controller can initiate appropriate further action (e.g. attempt to communicate with the sensor and perform a diagnostic and correction routine and report to a technician if that communication should fail). Similarly, if an existing element receives communication from a new element, it may communicate with the system maintenance or another CO/controller to determine if the new element should be on the network, before assisting the new element in its self-commissioning into the system.

Although control functions are discussed above for purposes of explaining the controller/controller service hierarchy, the controller functionalities also will typically support related data communication for reporting or the like. For example, sensor and/or lighting device status data may be reported to each applicable higher level controller service and becomes available to other equipment or entities with appropriate access to the controller service, e.g. so that a building manager can see what rooms are illuminated, what rooms are occupied, ambient light levels, UI device states, which lighting devices are ON/OFF in relation to the other room states, and the like. Similarly, the higher level controller service(s) may offer access to some or all of such data to outside parties, such as the power company.

Figure 2:
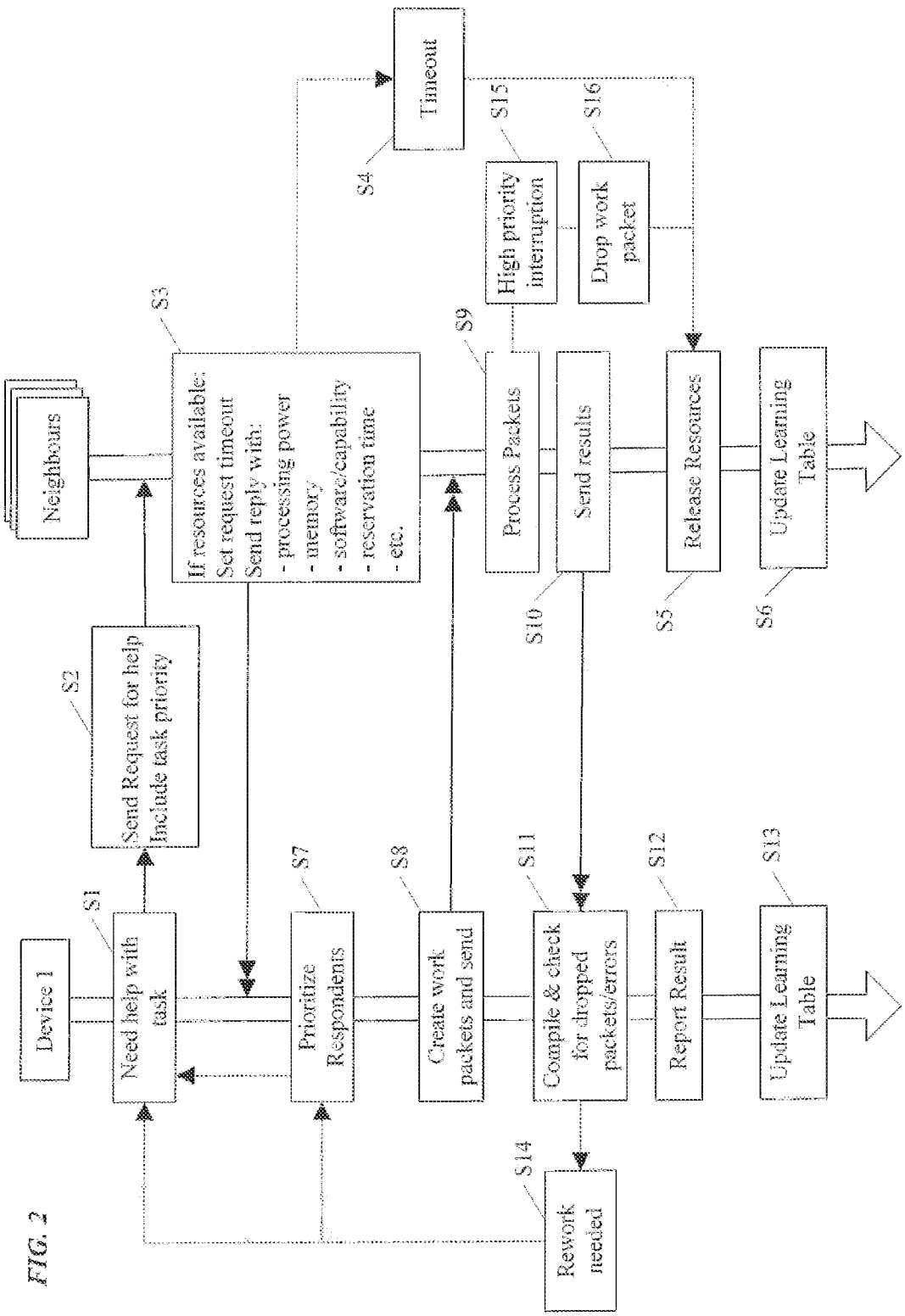
FIG. 2 is a flow chart of a simple example of a procedure for distributed processing, which may be implemented in a lighting system like that of FIG. 1.

The discussion above has outlined several techniques for distributed processing that may be implemented in the context of a lighting system like system 10 of FIG. 1. It may be helpful to consider some more specific examples of distributed processing operations. The process flow shown in FIG. 2 represents a simple example of a first type of procedure for distributed processing, which may be implemented in a lighting system like that of FIG. 1.

In the example, a first lighting system element has a processing job to perform. The element may be any intelligent element of the system 10, although for purposes of a specific example to discuss, we will assume that the element that has the processing job or task is one of the lighting devices, and is therefore identified as device 1 in FIG. 2. At step S1, the device 1 recognizes that it may be prudent to seek help to perform the task at hand, in this case, using resources of others of the intelligent system elements.

The device 1 can perform at least some tasks utilizing the element's own internal processor and memory. For example, a lighting device typically will be able to receive and appropriately process a lighting command, e.g. to set a light level and/or to set an associated color characteristic of the device's light source, to adjust its operational light output as commanded, without the need for resources of other intelligent elements of the system. A user interface (UI) device configured as a lighting controller generally will be able to send commands in response to user inputs to any lighting devices it controls; and, at least under most circumstances, a sensor will be able to report its sensed condition to any system elements configured to receive and utilize such information. However, other tasks may more readily lend themselves to distributed processing. Some such tasks with a potential for distributed processing may call for more processing or memory resources than readily available within the device 1 (e.g. without compromising core lighting functions of the device). Tasks with a potential for distributed processing typically will be tasks that can be handled in some reasonable fashion by some number of individual elements, e.g. can be readily split into sub-tasks for processing and/or storage in different elements, although there may be some tasks that by the nature of the processing or storage involved can not readily be spilt amongst multiple elements. Some tasks may require faster completion than the device alone can provide with only its own resources and therefore best implemented via distributed processing. Conversely some resource intensive tasks may be relatively insensitive to time-to-completion and amenable to wider distribution for processing (e.g. processing of audio, image or video data).

The distributed processing tasks may relate to lighting system operations, general processing tasks associated with the system and/or tasks for other parties. Lighting tasks that may be amenable to distributed processing, for example, may relate to lighting control operations, e.g. to process data from numerous sensors and make some overall control decision. Such lighting system tasks may be implemented by an element operating as a server for one of the CO/controller services. General processing tasks of the system may include, for example, processing audio or video inputs, either for a lighting control operation in response to user input in such a fashion or for some other system function or feature (e.g. to access information or a non-lighting control function in response to the user audio or video input). A task for an outside party might entail processing sensor, audio or video input data from the system elements for delivery to an outside party, either on a regular basis or in response to a specific request/instruction from the outside party. Similar processing may be handled on a distributed processing basis within the system, to process such data received from outside the system.

From the various factors involved in the processing task at hand, in the processing flow of FIG. 2, the device 1 will recognize that the task is one that is appropriate for distributed processing, e.g. involving processor or memory intensive operations and/or not time critical, etc. Also, based on characteristics of the job, e.g. source, lighting/non-lighting function, time sensitivity, or the like, the device 1 will assign a relative priority value or level to the particular processing job. The programming and/or the protocols used for signaling between system elements that may be involved in distributed processing in the system 10 can define an appropriate format and range of values for a job priority level parameter.

The lighting device 1 will be in communication with at least some number of other intelligent elements of the lighting system 10, referred to in this process flow example as neighbors of the device 1. The neighbor elements may be other lighting fixtures, intelligent UI devices, intelligent sensors or any other type(s) of intelligent elements that are part of or communicating via the lighting system 10.

At step S2, the lighting device 1 queries other intelligent system elements, i.e. the neighbors in the example, essentially to request help in performing the processing task or job. The queried neighbors may include any number of other elements of the system 10. A small group of neighbors, for example, might be those elements logically associated with the device in some small group or sub-network, such as elements in the same room or other service area sub-network. The queried neighbors may include all system elements on the system 10 or any sub-set of elements between the smallest size group and the complete set. As discussed more later, the sending device 1 may pick and choose which of its 'neighbors' from any particular grouping to query with regard to the current job or task, based on information about element performance learned from earlier distributed processing of other tasks and/or requirements for the task at hand.

The exemplary distributed processing procedure includes learning features, for the device that is distributing the job and for the neighbors that respond to queries or requests to contribute resources for distributed job processing and/or that actually contribute their resources to distributed job processing. The learning process on each side of the distributed processing, job sub-task distribution as opposed to offering resources and performing an allocated sub-task, help the various system elements to adapt and optimize the distributed processing operations over time. As will be discussed at various stages of our description of the exemplary processing flow, information that has been learned from distributed processing of prior jobs informs the various elements in their decisions or responses at various stages of the process. Optimization may also involve some randomization.

For learning purposes, each intelligent system element configured to distribute portions of a task may establish, maintain and store a learning table for the distribution function; and each intelligent system element configured to offer resources to another intelligent system element and if instructed contribute such resources to a distributed processing operation may establish, maintain and store a learning table for such in-bound query response and sub-task processing. Of course, many of the intelligent system elements may play both roles during processing of different jobs over a period of time and may learn about both sides of the distributed processing. An intelligent system element configured to participate on both sides of the distributed processing may maintain learned data about both types/sides of the operations, either in two tables or in a combined table. If separate tables are used, each table may be adjusted in response to a change in the other, in appropriate circumstances.

In general, learning entails analysis of performance by an element and/or by other elements involved in handling of each distributed processing job determine to distributed processing metrics of performance. Examples of learned performance parameters that may be assessed in selecting other neighbor elements during the task distribution include turn-around time or turn-around time per unit of processed data, number or percentage of dropped packets, average amount of memory resources offered (e.g. bytes of storage) and/or amount of processing resources offered (e.g. in units related to data to be processed, number of processing cycles or average processing rate) and/or actually provided, during some number of prior distributed job processing operations. Examples of learned performance parameters that may be assessed in determining how to respond to a new inquiry for distributed processing assistance include amount of data processed, time required, resources used, delay incurred in processing of other tasks, or the like, for tasks distributed by the received device.

In general, the learned distributed processing metrics of performance allows an element to prioritize one or more lists of neighbors/other elements for use in making decisions and selections based on highest relative ranking on the applicable list. For distribution, the device 1 may select some number of the highest ranking neighbors. In contrast, an element offering to take part in a distributed task may choose whether to offer to help or how much if any of that element's resources to offer based on the ranking of the particular requesting device 1, based on learned distributed processing metrics of performance. With such an approach, an element tends to select or respond most favorably to the highest ranked element(s) in the particular prioritized listing, in an effort to optimize operations.

When decisions in the process (e.g. FIG. 2) are made based on the learned performance metrics about other elements, however, the element making the decision can introduce a random variation in the decision, for example, to select or respond to a lighting device or other element that has not or seldom been chosen or favored at the particular decision point in the past. As a result, the element making the selection or response will from time to time randomly select or favor another element that would otherwise appear as less than optimum based solely on the previously learned performance information. However, this allows the selecting or responding element to learn more about the randomly chosen element for future processing purposes and update the parameters in the learned tablet(s) for optimization of future distributed processing operations. A random variation of this type, for example, may allow the element making the decision to discover changes and adjust its learned information accordingly, for better optimization of future distributed processing operations.

Returning to the process flow of FIG. 2, in a particularly intelligent implementation of the distributed processing, the device with the task to distribute can select among elements in some group or sub-group based on performance data about elements in the group or sub-group learned from prior job distribution operations for sending the query in step S2. The learned performance parameters for job distribution enables the device 1 to prioritize a list of neighbor elements for job distribution and to query some number of the highest priority elements likely to offer and provide sufficient resources to handle the particular task at hand. Only a few may be chosen from the high-end of the priority list for a small task, whereas the sending device 1 may select more or all of the neighbors to query for a larger task. As the process is repeated over time for multiple distributed processing tasks, the device 1 will tend to most often choose the other elements that are rated higher for performance based on the learned performance parameters, for the query step. Lower rated elements will be selected less often. However, the priority for such selection for the query step S2 may change over time as conditions at other elements change and the sending device 1 updates its learned performance metrics accordingly; and the occasional randomization of the neighbor selection can enhance the process of learning about changes.

The device 1 sends the query message through the network media used in the relevant portion(s) of the system 10 installed at the particular premises 12, to the neighbors chosen initially for purposes of the inquiry about the current task processing. The inquiry, for example, may be sent as a broadcast, sent as a multicast to selected neighbors or sent as individual data messages to each of the selected neighbors, depending on the network media and/or data communication protocols utilized by the particular system implementation.

The request message for the query in step S2 will include at least some information about the current job, including the assigned job priority level. The information in the query, for example, may also provide various metrics about the task at hand and/or the sub-tasks thereof being distributed to other elements. For example, such information may indicate the type of processing involved, the type/format of the data to be processed, any time constraints or deadlines for sub-task completion, the overall amount of data or the expected sub-divided amounts of data to be processed by recipient neighbors, or any other parameters about the task that may be helpful in enabling the queried neighbors to determine how to respond to the query. The information about the current job may also include a job or task identifier.

Each queried neighbor element will analyze the information about the job from the query message it receives from the device 1 in comparison to its own resources, current data processing operations, status or the like. For example, the receiving element may compare the priority of the task that is to be distributed to the priority or priories of any of its own tasks in progress or any distributed processing sub-tasks the receiving element may already be working on for other source elements. The receiving element may also analyze factors about the task that is to be distributed, versus what if any of its own resources that element might offer and allocate to the task, in view of its ongoing processing operations and any expected higher priority tasks. For example, if the receiving element is a lighting device, that receiving element may be able to offer some resources to handle part of the task but still reserve sufficient resources to address a command to change a light setting if received while working on a part of the task.

Neighbor elements that do not have (or for various reasons will not offer) resources may not respond to the query. Alternatively, such unavailable neighbor elements may send responses, but their responses in such cases would indicate that they are not offering resources to assist in performance of the distributed processing job currently offered by the device 1. In the example, the device 1 will adjust its learned table about its neighbors to reflect any neighbors that do not offer to assist in the distributed processing job, e.g. to indicate other elements did not respond or indicate any reason given in a response declining to participate.

Each receiving element that has resources available will set a request timeout and send a reply message back through the network to the device 1 (S3). This period essentially is a time limit during which the neighbor will wait for further instructions about the job. However, if the timeout period expires (S4) without follow-up instructions about the job from the device 1, then the neighbor will release the promised resources at step S5, in this scenario, without having processed any part of the task at hand. In this way, the unused resources are available for other uses by the neighbor or for other distributed processing operations. After releasing the resources, the neighbor element will update its learning table about distributed processing offered by other elements, as shown at S6. In the timeout scenario (that passed through S4), for example, the neighbor will update its learned performance metric information about device 1 to reflect that device 1 did not send a sub-task to the neighbor after the neighbor offered resources in response to the query. The neighbor can use such performance metric information in future to adjust its responses to future queries from device 1.

Returning to step S3, as noted, at least the neighbors that have and will offer available resources send back a reply message, which is received at the device 1. Each reply from a device offering to participate in the distributed processing operation will include information about the resources of the neighbor element which that element is offering to make available for sub-task processing of the currently offered job. Examples of such available resource information include: processing power, memory, software/capability, reservation time, etc. Each reply may also indicate the relative priority of any local task or prior distributed processing task that is already in progress on the responding neighbor element. In this step S3, the requesting device 1 will receive similar replies from some number of its neighbors, indicating whether or not the other intelligent system elements have processing or memory resources available for the processing job. In our example, at least some of the replies from neighbors offering available resources provide information about the resources that each other element offering to help in the distributed task processing can make available. In the example, the device 1 will adjust its learned table about its neighbors to reflect those neighbors that offered to assist in the distributed processing job and/or to reflect the resources each such neighbor offered in response to the inquiry sent in step S2.

In step S7, the device 1 with the task to distribute analyzes potential candidates for distributed processing of the task, for example, to prioritize a list of the neighbor elements that responded (respondents, in the drawing). The device 1 can prioritize the respondents based on information contained in the responses, for example, based on information about the resources each is offering and/or priority of any other tasks the respondents are already processing. The device 1 can also prioritize the respondents based on learned information regarding performance metrics of the respondents that the device 1 selected and used to assist in prior distributed processing operations.

The device 1 in our example will also know the priority and requirements of the data processing task that the device 1 is trying to distribute. From the prioritized list created in S7, the device 1 can now select an appropriate number of the respondents starting at the highest rank and working down through the list to select a sufficient number of the respondents to provide the resources to meet the requirements of the particular data processing task.

The device 1 essentially allocates portions of the processing job to the selected respondent elements. Hence, at step S8, the device 1 creates work packets for the selected respondents. By work packets here, we do not necessarily mean IP packets or the like, but instead are referring to sets of instructions and associated data for the portions of the job that the device 1 allocates to the selected respondents. For large processing jobs, for example, in a system using IP packet communications over the network media, each 'work packet' for a sub-task allocated to a selected respondent may utilize some number of IP packets addressed to the particular respondent neighbor element. The device 1 may send one, two more work packets to each of the selected respondent neighbor elements. In our example, the distributing device 1 stores a record of each work packet and an identifier of the neighbor element to which device 1 assigned the particular work packet.

The work packets created for each selected respondent may be tailored to the particular respondent. For example, respondents offering more processing or memory resources may be sent more of the data to process. Respondent elements with particularly advantageous capabilities (e.g. a video processor not currently engaged in another processing task) may receive task assignments particularly suited to their capabilities. The allocations and associated work packet creations also may be adjusted based on the learning table. For example, if a particular respondent has performed better in the past when handling a somewhat smaller data allocation, the device 1 may limit the data allocation for that element accordingly.

In the process flow of FIG. 2, in step S8, the device 1 sends the work packets to the selected respondents through the network communication media of the lighting system 10. Although not shown for convenience, the system elements may be configured to require an acknowledgement of each work packet. In such an arrangement, a neighbor would send an acknowledgement message back through the network to the distributing device 1. If no acknowledgement is received from a particular neighbor, after some number of one or more re-tries, the distributing device 1 could select a lower priority neighbor from the list used in step S8 and try sending the undelivered work packet to the alternate neighbor in a similar fashion. Each work packet sent/delivered to a neighbor will include a portion of the data to be processed for the particular task as well as instructions as to how the data in the work packet is to be processed, essentially to enable each respondent to perform an allocated portion or sub-task of the distributed processing job. Each work packet may include an identifier of the overall processing job and/or an identifier of the particular assigned sub-task.

At this point in the discussion, we will assume that each intelligent system element that receives a work packet for an allocated portion of the distributed processing job will successfully complete and return results for the portion of the job allocated thereto. Several scenarios in which work packets are dropped without sub-task completion will be discussed later.

Hence, at this point in our exemplary process flow, each of the neighbor elements that the device 1 selected for a sub-task receives one or more work packets containing data and instructions for that sub-task as part of the communications in step S8. The element receiving the work packet performs its allocated portion of the processing job on the received data, in accordance with the instructions, using resources of the processor and/or memory of the receiving element of the lighting system (step S9). At step S10, each selected respondent neighbor element sends a result of its sub-task processing back through the data communication network of the system 10 to the device 1. In our example, each of the work result packets sent back to the distributing device 1 includes an address or other identifier of the responding neighbor element that performed the sub-task as well as an identifier of the overall task/job and/or an identifier of the respective sub-task.

Upon sending sub-task results in step S10, each respondent neighbor element will release the resources utilized in processing the sub-task, at step S5. The resources become available again for other uses by the neighbor or for other distributed processing operations. After releasing the resources, the neighbor element again will update its learning table about distributed processing (at S6), in this case, the sub-task processing that the element performed for the device 1. In the completed sub-task scenario, for example, the neighbor will update its learned performance metric information based on analysis of the task of device 1 to reflect the size of the assigned sub-task, the amount of resources and/or time utilized, what if any other tasks of the respondent neighbor element were delayed during this distributed processing operation, or the like. The neighbor can use such learned performance metric information in future to adjust its responses to future queries from device 1.

Returning to the result transmission step S10, as a result of the transmissions from the neighbors selected back in step S10, the device 1 will receive processing results or the sub-tasks from other intelligent system elements. In step S11 in our example, the device 1 compiles the received results and checks the composite result to determine if any work packets were dropped or if there are any readily apparent errors. Sub-task identifiers and/or a combination of the overall task identifier and the neighbor address/identifier may assist the device 1 in combining sub-task results from the various participating neighbor elements into the appropriate overall composite result. At this point in our discussion, we will assume that no packets were dropped and no errors are detected. Hence, the compiling of the results of the allocated sub-task processing from the other system elements assisting in the current distributed processing operation essentially determines an overall result of the processing job. Processing by the device 1 proceeds to step S12, in which the device 1 reports the overall result. The report function here is given by way of just one example of an action that the device 1 may perform based on the overall result of the processing job. The report may be sent to a higher level processing element or service, e.g. a higher level control service 57 or to an outside system management device 53 or 57. As other examples, reporting the result may involve taking some action in the device 1, accessing data via the network, sending a face or voice recognition result to an outside device of another party, etc. Of course, the device or any other system element may act in any of a variety of other ways based on the overall result of the distributed processing operation.

At this point it may be helpful to consider a voice recognition task/job, by way of an example. The device 1 has digitized audio data to process for recognition. The work packets sent at S8 include portions of the digitized audio, e.g. sub-divided at apparent speech pauses between words. The neighbor elements process received digital audio data to recognize one or more words in the audio data segments. The returned work result packets represent words of recognized speech. Each returned result may include one or more words, depending on amount of the audio data sent to the respective neighbor element. The device 1 compiles the received words into a string of words in an order corresponding to the original audio stream (prior to division thereof for work packets).

At S12, the device 1 may simply send the string of words to another element in or communicating with the system for further processing or the like. Alternatively, the device 1 may itself perform additional processing, e.g. to analyze the word string to recognize a command, in which case the device 1 can act in response to the command or forward the command to another element in or communicating with the system for further processing or the like.

For example, if the spoken command is a lighting command, the device 1 acting as a controller can then instruct some number of lighting devices to adjust light settings thereof, in the service area where the audio for the spoken was received as an input, based on the command. As another example, if the recognized command is for obtaining access to other information, e.g. a request for a current quotation of the price of a particular stock, the device 1 can format an appropriate query and send that query to a server for a stock service. In response, the device 1 receives data answering the inquiry, from the stock service server; and the device 1 sends the resulting answer information through the system to an element of the system with an audio or display output capability for local presentation in the in the service area where the audio for the spoken information request command was received as an input.

Returning to the exemplary processing flow of FIG. 2, upon completion of the distributed processing job, e.g. upon reporting the overall result in S12 in our example, the device 1 will also update its learning table (step S13) to reflect the performance of various other system elements with respect to the just completed job. For example, the table may be updated to reflect devices that did or did offer resources in response to the query. The learning table may be updated to reflect successful completion by some of the other/neighbor elements versus packets dropped or errors created by processing of sub-tasks by still others of the neighbor elements. As outlined earlier, the device 1 can utilize the learning table updated in step S13 to improve its neighbor selections (e.g. at steps S1-S2 and steps S7-S8) in future distribution of jobs amongst its neighbors.

If sufficient resources are available and/or enough other elements respond, some or all of the work packets sent out at step S8 may be duplicated and sent to two or more of the selected respondent neighbor elements, for redundant processing. When the device 1 compiles the results at S11, it may receive duplicate sub-task processing results. If the device 1 detects errors, in many cases, at least one of the duplicative sub-task processing results may be successful and free of errors; and the device 1 can utilize the error free results and discard the duplicate version that is subject to errors. In some cases, an element that accepted a sub-task may not respond, at least in a timely fashion. From the perspective of device 1, the work packet sent to such an element has been 'dropped.' However, if another element assigned the same sub-task successfully completes its processing of that sub-task, the device 1 can still compile the overall job result using successfully completed sub-task result from that other respondent. Hence, duplicative allocation of sub-tasks can improve likelihood of successful completion of the distributed processing task. However, in some cases, problems may still arise. In any of these cases, the update of the learning table in step S13 will reflect such outcomes with respect to the performance metric data stored in the table relative to the respective neighbor elements.

Assume next that when the device 1 checks results in step S11, and device 1 determines that some portion of the job has not been successfully completed. In this situation, the device 1 determines at step S14 that some rework of the job is necessary. If capable, the device 1 may perform any additional processing needed itself. If not, however, then the device can again distribute some or all of the sub-tasks to other system elements. In our illustrated example, depending on the type and/or amount of further data processing required to complete the distributed processing task, processing flows from step S14 back to S1 or S7 and from there through the other steps of the process, essentially as discussed above, to obtain distributed processing results to complete the overall data processing job.

There may be a variety of reasons why a sub-task is not successfully completed, and either the work packet is dropped or the results returned to the device 1 are subject to errors. For example, some communication media may be subject to communication-induced errors too extensive to address with routine error correction technologies. In other cases, some part of the data network of the system 10 may be down or congested. However, in other cases, events at one or more of the selected respondent neighbor elements may result in a dropped work packet, as reflected in our exemplary process flow at steps S15 and S16.

Returning to step S9, the various neighbors that responded, were selected and received work packets are processing data from the packets in accordance with the associated data processing instructions. The overall processing job, and thus the sub-tasks thereof, will have an assigned priority. Other tasks handled by the various intelligent system elements also have assigned priorities. At step S15, one of the system elements that has been processing data from the work packets at S9 now receives (or internally generates) an interrupt in view of an apparent need to perform some other task having a higher priority than the particular distributed processing job. That element will suspend its processing of the allocated sub-task and perform the processing for the higher priority task. Depending on the resources and time taken for the higher priority task, the element may be able to resume sub-task processing after completing processing for the higher priority task and still deliver its sub-task results within the timeframe set for the particular distributed processing job. If not, however, then the system element will drop the processing of the work packet of the particular distributed processing job (step S16), to process the higher priority task. In this later situation, the element will release the promised resources at step S5. After releasing the resources, the neighbor element will update its learning table about distributed processing offered by other elements, as shown at S6. In the interrupt scenario (that passed through S15), for example, the neighbor will update its learned performance metric information about device 1 to reflect that the respondent neighbor element was unable to complete the sub-task before dropping the packet to handle the interrupt for a higher priority task.

Although not discussed in detail, the device 1 may also process some portion data or otherwise perform some sub-task of the distributed job before compiling the results. Alternatively, the device 1 itself may be involved as a respondent neighbor in another distributed processing operation while it waits for responses from the respondent neighbors in the job the device 1 distributed.

Although the discussion of FIG. 2 mainly focused on distributed processing amongst lighting devices, associated user interface devices and sensor devices, as noted earlier, the resource sharing implemented by a process flow like the example of FIG. 2 may take advantage of and share resources of any other type(s) of intelligent elements that are part of or communicating via the lighting system 10. For example, the lighting system 10 may be able to use the memory and/or one or more processors of a cooperative laptop, desktop computer, host/server computer or the like that is coupled to communicate via the data communication media of the lighting system 10. The system also may support communications and/or interactions with a wide range of other devices within the premises 12 having some level of intelligence and having appropriate data communication capabilities, e.g. HVAC components, smart appliances, etc. If any of such other devices have resources to share and are appropriately programmed, the lighting system 10 may be able to use the memories and/or processors of such other cooperative devices. Conversely, some computers coupled to the communication media and/or some other types of cooperative devices may be able (and permitted if appropriate) to request and obtain access to resources of the lighting devices, associated user interface devices and sensor devices available for sharing for distributed processing in a manner like that shown by way of example in FIG. 2.

In a system like that shown in FIG. 1, some functions may be implemented in the form of servers, for example, for central control, CO functions in support of system commissioning and/or for central connectivity to outside networks and equipment. Some or all of the intelligent system elements may have sufficient capabilities to be able to run such server programming in addition to performing other processing tasks for the normal functions of such elements. For example, a lighting device 11A' or 11B' may be configured to operate as a server 57 for CO and/or controller purposes, in addition to operating as a lighting device. To the extent that a server task for such a centralized service is amenable to distributed processing, the element also configured as a server may distribute the server processing task to other elements, in essentially the manner described above relative to FIG. 2.

However, the system may implement an additional form of distributed processing with respect to such server functionality. A single instance of a server running on one system element may at times be stressed by high processing demands. Also, a system that utilizes a single server instance for a crucial system function or service may be vulnerable to interruptions, e.g. if there is a failure of the element or of communication with the element running the server instance. To address such possible concerns, a system 10 can run some number of separate instances of a particular server functionality, in parallel with one another on multiple intelligent system elements. Each such server instance would utilize a copy of the relevant server programming and a copy of any data or database needed for the particular service. Use of multiple instances of the servers may also speed up response time when interacting with clients implemented on the other system elements.

Figure 3:
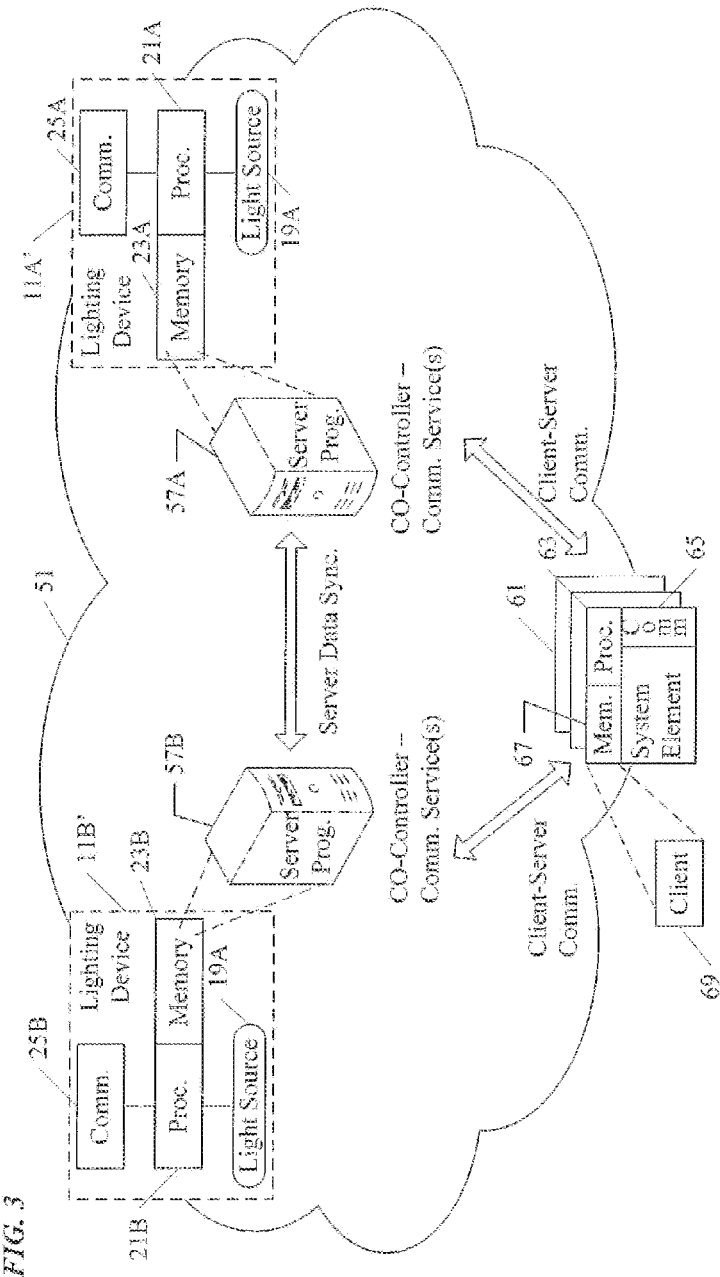
FIG. 3 is an alternative diagram of selected aspects of the system of FIG. 1, representing an example of multiple-instance server type of distributed processing.

To the extent that data used by the server functionality may change over time of operation of the system 10, the sever instances would coordinate with each other to update the copy of the data/database at or used by each instance of the server, e.g. to maintain synchronism as between multiple instances of the relevant data. FIG. 3 is a simplified illustration of such an arrangement. Alternatively, the data used by the server functionality may be stored in a distributed manner across multiple elements (e.g. as distributed hash tables) to minimize the synchronization operations.

In the example, two of the lighting devices 11A' and 11B' run instances 57A and 57B of server programming for execution by processors 21A and 21B thereof. The server instances 57A, 57B configure those lighting devices 11A', 11B' to operate in a distributed processing fashion to implement a server function with respect to an overall processing functionality of the system and related server communications via the data communication network, generally represented again by the cloud 51. The server program instances 57A, 57B are represented generally by icons similar to hardware devices such as server computers; but the program instances 57A, 57B are actually server programming stored in memories 23A, 23B for execution by the processors 21A, 21B (hence, the servers 57A, 57B are shown in dotted line form). As outlined earlier, the overall processing function of the system implemented by such server instances may relate to a CO functionality, some type of controller service, or a central communication function/service. Also, although only two instances of the server program are shown, there may be any appropriate number of such instances for implementation of a particular function or service in a system of a particular size and/or complexity.

The lighting devices 11A' and 11B' are shown in this drawing as examples of intelligent system elements that may store and execute server programming instances. It should be noted, however, that intelligent sensors, user intelligent interface devices or other intelligent elements of the system 10 (FIG. 1) or communicating through the on-premises data network of the system 10 may store and execute server programming instances instead of or in addition to the intelligent lighting devices 11A' and 11B'. One set of server instances may implement the server-side aspects and communications with respect to one or any number of overall system functionalities. However, other overall processing functionalities of the system 10 may utilize server program instances stored in and executed on other system elements.

At least with respect to the particular overall processing function of the system 10 supported by the server program instances 57A, 57B, the server program instances 57A, 57B interact with some number of other intelligent system elements represented genetically by the boxes at 61. The other elements can be any of the types of intelligent system elements discussed above and will include at least a processor 63, a memory 65 and a communication interface, which may be similar to components of the intelligent system elements discussed with regard to the earlier drawings.

As shown in FIG. 3, various other intelligent system elements 61 will include client programming stored in memories 67 thereof for execution by the processors 63 of the other intelligent system elements 61, to configure each of the other intelligent system elements 61 to implement a client function with respect to the overall processing functionality of the system supported by the server instances 57A, 57B. The client programming 69 will also support related client communications with the server function implemented by the instances of the server programming 57A, 57B on the lighting devices 11A', 11B's in our example. Hence, the drawing shows arrows through the network for client-server communications between the server instances 57A, 57B and the clients 69 at the intelligent system elements 61

In a multi-instance server implementation such as shown in FIG. 3, any one server may be able to perform on its own to handle client-server interactions with one or more elements 61 independently of the other server instance(s), while each the other server instance(s) independently handles other client-server interactions. To the extent that they relate to the same overall system function, however, they will often use or process some of the same data. For example, if a particular overall processing functionality of the system involves a database, all of the relevant server instances will manipulate that same database. In our two instance server example, to insure that both instances of the server programming 57A, 57B have access to the same state of the database if or when necessary, the server instances 57A, 57B will communicate with each other through the data communication network 51 to synchronize any separate copies of the database maintained by or for the individual server instances 57A, 57B, as represented by the Sync arrow between the server instances 57A, 57B. Any appropriate data synchronizing technique may be used.

The use of multiple server instances allows for server load distribution across multiple hardware platforms of intelligent elements of the system. The use of multiple server instances may also provide redundancy in the event of impairment or failure of a system element or communications to an element executing one of the server instances. Various load distribution and/or fail-over techniques may be used.

Figure 4:
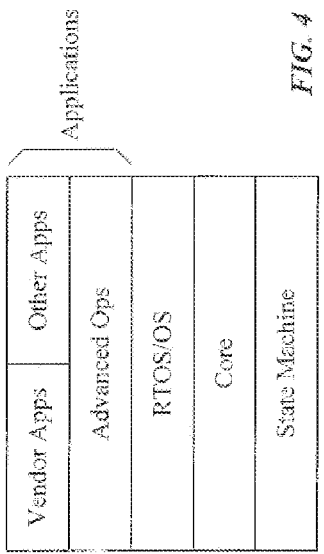
FIG. 4 is a stack diagram useful in explaining exemplary program configuration.

FIG. 4 is a logical diagram of a program stack, for programming which may be used in intelligent system elements for an implementation of a lighting system such as that discussed above relative to FIGS. 1-3.

At its most basic level, a processor may be considered or modeled as a state machine, as shown at the lowest layer of the stack in FIG. 4. In its simplest form, a state machine will switch between states in response to different sets of signals or values on its inputs. Core processing functions may be just above but near to the state machine level. The core function layer, for example, may implement the driver and/or interface functions for converting between the inputs and outputs of the state machine and the signals produced by or used to drive any input and/or output components of the intelligent system element. The core functions also provide a program interface between the state machine and the higher level programming.

Logically speaking, several layers of software programming run on top of the state machine and core processor functions, in our example. The next highest layer may be a real-time operating system (RTOS) configured to service real-time application requests or interrupts, or the next layer may be a more computer-like operating system (OS). The top two layers in the exemplary stack represent applications running on top of and thus through the operating system layer. Part or a sub-layer at the applications level of the exemplary stack is for applications for advanced operations (Ops). Resource sharing type distributed processing, such as discussed above relative to FIG. 2, for example, may be implemented via an advanced ops program application.

The top layer of the stack is a general application layer. Any of a wide variety of applications may reside and run at this layer of the logical program stack. The CO/controller services and the responsive operations of the system elements may be implemented at the application layer. Hence, the top layer in our example includes some applications by or controlled by the system vendor, for example, to support system services that the vendor designs the system to provide. For example, the vendor application layer may include the client 69 and/or a server instance 57A or 57B for a particular CO, controller or communication service of the system 10.

For some purposes, the protocol stack and aspects of the programming/configuration at various layers are defined and secured by the system manufacturer. It is envisioned that the system 10 will be open to third party application and/or device developers. In an open system, third parties will be able to build devices that utilize the system and its protocols for operation including interactions with elements provided by the system manufacturer. In such a system, the system manufacturer may opt to allow third parties some access to program or otherwise interact at various layers of the stack, for example, to allow third parties to manufacturer and sell other elements or devices for use on the system and/or to allow third parties to write applications for the system. Hence, the highest layer in our example also may include applications (Apps) by other providers, for example, third party software developers. Manufacturers of other elements intended for operation on or through the system are allowed to write application layer programming for their own CO/controller services and for system elements like the luminaries by the system vendor to allow the system vendor's elements to interact with elements on the system developed by other vendors. The other applications also may include client and/or server programming but for other services or functions deployed on the system using software developed by other entities.

In the discussion of programming, it was assumed that the resource sharing type distributed processing (e.g. of FIG. 2) was implemented at the advanced ops application layer of the stack. The CO/controller services and the responsive operations of the system elements are implemented at the application layer. Actual implementations, however, may involve CO/controller service implementation or include functionalities at other layers of the stack with corresponding functionalities at the same layer of the stack in the other system elements. In such a case, the system manufacturer would still have portions of the programming and configuration routine at those layer(s) limited to that manufacturer's programs, devices and personnel. However, so long as not interfering with the manufacturer's functionalities and configuration data at the particular layer(s), third parties may be allowed to program and establish configuration at the same protocol layer(s) for their own purposes.

The open approach, for example, may also enable a customer that will own or occupy a particular premises having a system 10 to purchase and install third party devices and/or to purchase additional programming for desired functions different from (or possibly competing with) those offered by the system manufacturer.

The degree of third party access to the layers of the program stack may vary amongst third party vendors. A trusted or 'certified partner' may have access to more layers, whereas non-certified third parties may only be allowed to connect to the media and write application layer programming that otherwise conforms to the application layer programming interfaces to the lower layers of the stack.

Users of different types may also be granted access to different amounts of the program stack. For example, a government entity with a high degree of sophistication and a need for security may have greater access to control its system, whereas a small business enterprise may only be allowed access to adjust the commissioning/configuration at the application level.

Figure 7:
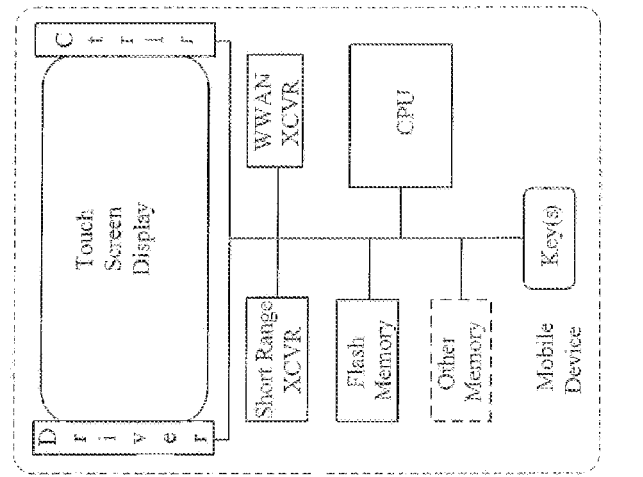
FIG. 7 is a simplified functional block diagram of a mobile device, as an alternate example of a user terminal device, for possible communication in or with the system of FIG. 1.
Figure 6:
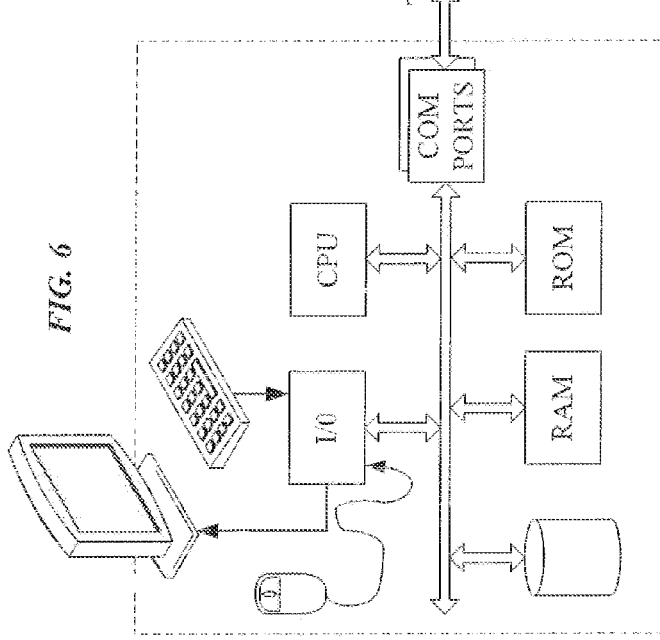
FIG. 6 is a simplified functional block diagram of a personal computer or other user terminal device, which may be used as the remote access terminal, in the system of FIG. 1.
Figure 5:
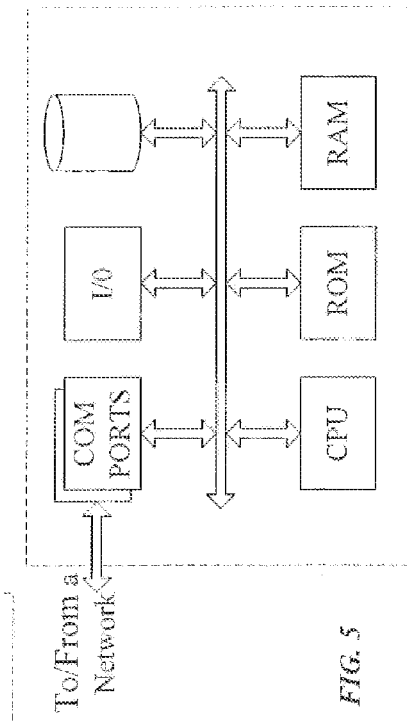
FIG. 5 is a is a simplified functional block diagram of a computer that may be configured as a host or server, for example, to function as the external server in the system of FIG. 1.

As shown by the above discussion, at least some functions of devices associated or in communication with the networked lighting system 10 of FIG. 1, such as elements shown at 53 and 55, may be implemented with general purpose computers or other general purpose user terminal devices, although special purpose devices may be used. FIGS. 5-7 provide functional block diagram illustrations of exemplary general purpose hardware platforms.

FIG. 5 illustrates a network or host computer platform, as may typically be used to implement a host or server, such the computer. FIG. 6 depicts a computer with user interface elements, as may be used to implement a personal computer or other type of work station or terminal device, such as one of the terminal 55 in FIG. 1, although the computer of FIG. 6 may also act as a server if appropriately programmed. The block diagram of a hardware platform of FIG. 7 represents an example of a mobile device, such as a tablet computer, smartphone or the like with a network interface to a wireless link, which may alternatively serve as a user terminal device like 55. It is believed that those skilled in the art are familiar with the structure, programming and general operation of such computer equipment and as a result the drawings should be self-explanatory.

A server (see e.g. FIG. 5), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Also, a computer configured as a server with respect to one layer or function may be configured as a client of a server in a different layer and/or for a different function. In a similar fashion, a central function or service 57 implemented as a server functionality with respect to client programming/functionality of intelligent system elements at premises 12 may itself appear as a client with respect to a server in a different layer and/or for a different function. For example, the service 57 may appear as a client of a server functionality provided by an external host or other computer 53, although the central function or service 57 may also appear as a server to on-premises or external user terminal devices such as 55.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 6). A mobile device (see FIG. 7) type user terminal may include similar elements, but will typically use smaller components that also require less power, to facilitate implementation in a portable form factor. The example of FIG. 7 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 5 and the terminal computer platform of FIG. 6 are shown by way of example as using a RAM type main memory and a hard disk drive for mass storage of data and programming, whereas the mobile device of FIG. 7 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 6). The mobile device example in FIG. 7 touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 5-7 in their present form show computers and user terminal devices, generally similar configurations also may be used within other elements of the lighting system 10. For example, one implementation of the brain, communication and interface elements of a lighting device, a standalone sensor or a user interface device may utilize an architecture similar to that of one of the computers or mobile terminals. As a more specific example, the personal computer type hardware in FIG. 6 (except for the keyboard, mouse and display) could serve as the brain and communication elements of a lighting device, where the input/output interface I/O would interface to an appropriate light driver and to any sensor(s) or other enhancement input or output device(s) included within the lighting device. As another example of use of an architecture similar to those of FIGS. 5-7 that may be utilized in a system like that of FIG. 1, a lighting controller or other user interface device (UI) might utilize an arrangement similar to the mobile device of FIG. 7, albeit possibly with only one transceiver compatible with the networking technology of the particular premises (e.g. to reduce costs).

For information about other examples of intelligent lighting devices, which may be suitable for use in a networked lighting system like that of FIG. 1, attention may be directed to U.S. application Ser. No. 13/463,594 Filed May 3, 2012 entitled "LIGHTING DEVICES WITH INTEGRAL SENSORS FOR DETECTING ONE OR MORE EXTERNAL CONDITIONS AND NETWORKED SYSTEM USING SUCH DEVICES," the disclosure of which is entirely incorporated herein by reference.

As also outlined above, aspects of the distributed processing techniques (e.g. of FIG. 2 and/or FIG. 3), may be embodied in programming of the appropriate system elements. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer 53 of the lighting system service provider into any of the lighting devices, sensors, user interface devices, etc. of or coupled to the system 10 at the premises 12, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded, by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system, comprising:
    intelligent system elements;
    each of a plurality of the intelligent system elements including a light source and being configured as a lighting device, and at least one of the intelligent system, elements: including a user interface component and being configured as a lighting controller, or including a detector and being configured as a sensor;
    wherein each respective intelligent system element further includes:
    a communication interface configured to enable communication via a link of a data communication network available to the intelligent system elements;
    a processor coupled to the light source, the user interface component or the detector and coupled to communicate via the communication interface and the network link;
    a memory accessible to the processor;
    programming in the memory which configures the processor to control operations of the respective intelligent system element as a lighting device, a lighting controller or a sensor and which configures the processor to implement distributed processing functions, including functions to:
    when the respective intelligent system element has a processing job to perform using resources of others of the intelligent system elements:
    query the other intelligent system elements and receive responses from the other intelligent system elements as to whether or not the other intelligent system elements have processing or memory resources available for the processing job;
    based on the responses, allocate portions of the processing job to a plurality of the other intelligent elements;
    send data and instructions to each intelligent system element of the plurality of the other intelligent system elements, for performing an allocated portion of the processing job;
    receive from at least some of the plurality of the other intelligent system elements results of the performance of the allocated portions of the processing job;
    processing the received results to determine an overall result of the processing job; and
    performing an action based on the overall result of the processing job.

2. The system of claim 1, wherein:
    the at least one of the intelligent system elements includes the user interface component and is configured as the lighting controller, and
    the programming in the memory of the intelligent system element configured as the lighting controller configures the processor of that intelligent system element to provide a lighting control user interface via the interface component and to implement user responsive lighting control operations with respect to one or more of the lighting devices at least in part by communication with the one or more of the lighting devices via the data communication network.

3. The system of claim 1, wherein:
    the at least one of the intelligent system elements includes the detector and is configured as the sensor;
    the intelligent system element configured as the sensor further includes an interface circuit for the detector;
    the processor of the intelligent system element configured as the sensor is coupled to the interface circuit, and
    the programming in the memory of the intelligent system element configured as the sensor configures the processor of that intelligent system element to control operation of the sensor to provide information as to a condition sensed by the detector to one or more other intelligent system elements via the data communication network.

4. The system of claim 1, wherein the distributed processing functions further including functions to:
    analyze the responses and/or aspects of the received results, to determine distributed processing metrics of performance of the other intelligent system elements, with respect to handling of the processing job;
    store the distributed processing metrics of performance of the other intelligent system elements; and
    when the respective intelligent system element has another processing job to perform using resources of others of the intelligent system elements, adjust one or more of the functions of the respective intelligent system element with respect to the other job based on the stored distributed processing metrics of performance of the other intelligent system elements.

5. The system of claim 1, wherein the programming in the memory of each respective one of the intelligent system elements configures the processor of the respective intelligent system element to implement further distributed processing functions, including functions to:
    respond to an inquiry received from one of the intelligent system elements via the network by sending a response with information identifying processing resources of the processor and/or resources in the memory of the respective intelligent system element available for distributed processing via the network to the respective lighting device;
    receive data and instructions for performing a portion of the processing job from the one intelligent system element via the network;
    process the received data in accordance with the instructions using resources of the processor and/or memory of the respective intelligent system element; and
    send a result of the processing via the network to the one intelligent system element via the network.

6. The system of claim 5, wherein the distributed processing functions further including functions to:
    analyze the processing of the received data to determine distributed processing metrics of performance of the respective intelligent system element;
    store the distributed processing metrics of performance of the respective intelligent system element; and
    when the respective intelligent system element receives another query from one of the intelligent system elements via the network, base a response to the other query at least in part on the stored distributed processing metrics of performance of the other intelligent system elements.

7. An intelligent system element for operation in a lighting system, the intelligent system element comprising:
a lighting related component;
a communication interface configured to enable communication via a link of a data communication network with other intelligent elements of the lighting system;
a processor coupled to the lighting related component and coupled to communicate via the communication interface and the network link;
a memory accessible to the processor;
programming in the memory which configures the processor to control a lighting related operation of the intelligent system element and which configures the processor to implement distributed processing functions, including functions to:
when the intelligent system element has a processing job to perform using resources of the other intelligent elements of the lighting system:
query the other intelligent elements of the lighting system and receive responses from the other intelligent elements of the lighting system as to whether or not the other intelligent elements of the lighting system have processing or memory resources available for the processing job;
based on the responses, allocate portions of the processing job to a plurality of the other intelligent elements of the lighting system;
send data and instructions to each element of the plurality of the other intelligent elements of the lighting system for performing an allocated portion of the processing job;
receive from at least some of the plurality of the other intelligent elements of the lighting system results of the performance of the allocated portions of the processing job;
processing the received results to determine an overall result of the processing job; and
performing an action based on the overall result of the processing job.

8. The intelligent system element of claim 7, wherein:
the lighting related component comprises a light source; and
the programming in the memory which configures the processor to control the lighting related operation configures the intelligent system element to operate as a lighting device.

9. The intelligent system element of claim 7, wherein:
the lighting related component comprises a user interface component; and
the programming in the memory which configures the processor to control the lighting related operation configures the intelligent system element to operate as a lighting controller with respect to one or more lighting devices of the lighting system.

10. The intelligent system element of claim 7, wherein:
the lighting related component comprises a detector; and
the programming in the memory which configures the processor to control the lighting related operation configures the intelligent system element to operate as a sensor.

11. A system, comprising:
intelligent system elements,
each of a plurality of the intelligent system elements including a light source and being configured as a lighting device, and at least one of the intelligent system elements: including a user interface component and being configured as a lighting controller, or including a detector and being configured as a sensor;
wherein each respective intelligent system element further includes:
a communication interface configured to enable communication via a link of a data communication network available to the intelligent system elements;
a processor coupled to the light source, the user interface component or the detector and coupled to communicate via the communication interface and the network link;
a memory accessible to the processor;
programming in the memory which configures the processor to control operations of the respective intelligent system element as a lighting device, a lighting controller or a sensor and which configures the processor to implement distributed processing functions, including functions to:
when another of the intelligent system elements has a processing job to perform on a distributed basis;
respond to an inquiry received from the other intelligent system element via the network by sending a response with information identifying processing resources of the processor and/or resources of the memory available for distributed processing via the network to the other intelligent system element;
receive data and instructions for performing a portion of the processing job from the other intelligent system element via the network;
process the received data in accordance with the instructions using resources of the processor and/or memory of the respective lighting device; and
send a result of the processing via the network to the other intelligent system element.

12. The system of claim 11, wherein:
the at least one of the intelligent system elements includes the user interface component and is configured as the lighting controller,
the programming in the memory of the intelligent system element configured as the lighting controller configures the processor of that intelligent system element to provide a lighting control user interface via the interface component and to implement user responsive lighting control operations with respect to one or more of the lighting devices at least in part by communication with the one or more of the lighting devices via the data communication network.

13. The system of claim 11, wherein:
the at least one of the intelligent system elements includes the detector and is configured as the sensor;
the intelligent system element configured as the sensor further includes an interface circuit for the detector;
the processor of the intelligent system element configured as the sensor is coupled to the interface circuit, and
the programming in the memory the intelligent system element configured as the sensor configures the processor of that intelligent system element to control operation of the sensor to provide information as to a condition sensed by the detector to one or more other intelligent system elements via the data communication network.

14. The system of claim 11, wherein the distributed processing functions further including functions to:
analyze the processing of the received data to determine distributed processing metrics of performance of the respective intelligent system element;
store the distributed processing metrics of performance of the respective intelligent system element; and
when the respective intelligent system element receives another inquiry from one of the intelligent system elements via the network, base a response to the other inquiry at least in part on the stored distributed processing metrics of performance of the other intelligent system elements.

15. An intelligent system element for operation in a lighting system, the intelligent system element comprising:
a lighting related component;
a communication interface configured to enable communication via a link of a data communication network with other intelligent elements of the lighting system;
a processor coupled to the lighting related component and coupled to communicate via the communication interface and the network link;
a memory accessible to the processor;
programming in the memory which configures the processor to control a lighting related operation of the intelligent system element and which configures the processor to implement distributed processing functions, including functions to:
when one of the other intelligent elements of the lighting system has a processing job to perform on a distributed basis:
respond to an inquiry received from the other intelligent element of the lighting system via the network by sending a response with information identifying processing resources of the processor and/or resources of the memory available for distributed processing via the network to the other intelligent element;
receive data and instructions for performing a portion of the processing job from the other intelligent element via the network;
process the received data in accordance with the instructions using resources of the processor and/or memory; and
send a result of the processing via the network to the other intelligent element.

16. The intelligent system element of claim 7, wherein:
the lighting related component comprises a light source; and
the programming in the memory which configures the processor to control the lighting related operation configures the intelligent system element to operate as a lighting device.

17. The intelligent system element of claim 7, wherein:
the lighting related component comprises a user interface component; and
the programming in the memory which configures the processor to control the lighting related operation configures the intelligent system element to operate as a lighting controller with respect to one or more devices of the lighting system.

18. The intelligent system element of claim 7, wherein:
the lighting related component comprises a detector; and
the programming in the memory which configures the processor to control the lighting related operation configures the intelligent system element to operate as a sensor.

19. A system, comprising:
intelligent system elements,
each of a plurality of the intelligent system elements including a light source and being configured as a lighting device, and at least, one of the intelligent system elements: including a user interface component and being configured as a lighting controller, or including a detector and being configured as a sensor;
wherein each respective intelligent system element further includes:
(a) a communication interface configured to enable communication via a link of a data communication network;
(b) a processor coupled to the light source, the user interface component or the detector and coupled to communicate via the communication interface and the network link;
(c) a memory accessible to the processor; and
(d) programming in the memory which configures the processor to control operations of the respective intelligent system element as a lighting device, a lighting controller or a sensor;
two instances of server programming stored in the memories of respective first and second ones of the intelligent system elements for execution by processors of the first and second intelligent system elements, which configure the first and second intelligent system elements to operate in a distributed processing fashion to implement a server function with respect to an overall processing function of the system and related server communications via the data communication network; and
client programming stored in memories of intelligent system elements other than the first and second lighting devices for execution by processors of the other intelligent system elements to configure each of the other intelligent system elements to implement a client function with respect to the overall processing function of the system and related client communications with the server function implemented by the instances of the server programming on the first and second intelligent system elements.

20. The system of claim 19, wherein the overall processing function of the system implemented by the two instances of server programming includes one or more of:
a central lighting control function of the system;
communication of the system with an external wide area data communication network; and
collection and/or distribution of element configuration data during intelligent system element commissioning operations.

* * * * *